United States Patent
Han et al.

(10) Patent No.: US 12,477,604 B2
(45) Date of Patent: Nov. 18, 2025

(54) METHODS AND APPARATUS FOR CHANNEL ACCESS IN A MULTI-LINK WIRELESS SYSTEM

(71) Applicant: ZTE Corporation, Guangdong (CN)

(72) Inventors: Zhiqiang Han, Guangdong (CN); Bo Sun, Guangdong (CN); Yonggang Fang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 262 days.

(21) Appl. No.: 17/795,526

(22) PCT Filed: May 22, 2020

(86) PCT No.: PCT/CN2020/091806
§ 371 (c)(1),
(2) Date: Jul. 26, 2022

(87) PCT Pub. No.: WO2021/109485
PCT Pub. Date: Jun. 10, 2021

(65) Prior Publication Data
US 2023/0083503 A1    Mar. 16, 2023

(51) Int. Cl.
*H04W 76/15* (2018.01)
*H04W 84/12* (2009.01)

(52) U.S. Cl.
CPC ............ *H04W 76/15* (2018.02); *H04W 84/12* (2013.01)

(58) Field of Classification Search
CPC ........... H04W 56/001; H04W 72/0446; H04W 88/02; H04W 88/08; H04W 74/0816; H04W 76/15; H04W 84/12
See application file for complete search history.

(56) References Cited

U.S. PATENT DOCUMENTS

| 8,073,015 B2 | 12/2011 | Galli et al. |
| 2013/0329600 A1 | 12/2013 | Vedula et al. |

(Continued)

FOREIGN PATENT DOCUMENTS

| CN | 101939924 A | 1/2011 |
| CN | 104365142 A | 2/2015 |

(Continued)

OTHER PUBLICATIONS

E. Khorov et al., "Current status and directions of IEEE 802.11be the future Wi-Fi 7", IEEE Access, vol. 8, pp. 88664-88688, May 2020 (Year: 2020).*
Jang et al.. "Multi-l ink Setup according to STR capability", Korean Application KR-10-2019-0161039, Dec. 5, 2019, Total pp. 75 (Year: 2019).*

(Continued)

*Primary Examiner* — Shah M Rahman
(74) *Attorney, Agent, or Firm* — Perkins Coie LLP

(57) ABSTRACT

Methods and systems for securely sending user plane data from a base station to an Artificial Intelligence (AI) server via a mobile telecommunication network are disclosed herein. A method performed by the base station located in a Radio Access Network (RAN) includes: sending an interface setup request to the (AI) server, receiving an interface setup response from the AI server, establishing, by exchanging cryptographic keys using an Internet Key Exchange (IKE) protocol, a data transport tunnel between the base station and the AI server based on an Internet Protocol Security (IPSec) network protocol, and sending the user plane data from the base station to the AI server for training artificial intelligence based models.

17 Claims, 19 Drawing Sheets

(56) References Cited

U.S. PATENT DOCUMENTS

| | | |
|---|---|---|
| 2014/0211703 A1 | 7/2014 | Seok |
| 2019/0335454 A1* | 10/2019 | Huang ................ H04W 88/085 |
| 2020/0029347 A1 | 1/2020 | Huang et al. |
| 2020/0404737 A1* | 12/2020 | Cariou ................. H04W 48/14 |
| 2021/0014911 A1* | 1/2021 | Patil ..................... H04L 1/1621 |
| 2021/0058936 A1* | 2/2021 | Gordaychik ...... H04W 72/0453 |
| 2021/0321473 A1* | 10/2021 | Monajemi ............ H04B 17/336 |
| 2021/0337613 A1* | 10/2021 | Seok ..................... H04W 76/15 |
| 2022/0210834 A1* | 6/2022 | de la Oliva ........... H04L 1/0005 |
| 2022/0225236 A1* | 7/2022 | Bang ................. H04W 52/0248 |
| 2022/0272783 A1* | 8/2022 | Yang .................... H04W 76/11 |
| 2023/0046270 A1* | 2/2023 | Huang ..................... H04L 1/22 |
| 2023/0062989 A1* | 3/2023 | Kim ..................... H04W 76/15 |
| 2023/0117918 A1* | 4/2023 | Jang ..................... H04W 76/15 370/329 |
| 2023/0156525 A1* | 5/2023 | Kim ..................... H04W 88/06 370/329 |
| 2023/0164842 A1* | 5/2023 | Jang ..................... H04W 76/15 370/329 |
| 2023/0179686 A1* | 6/2023 | Kim ..................... H04W 76/20 370/329 |
| 2023/0345349 A1* | 10/2023 | Kim ..................... H04W 76/15 |
| 2024/0015640 A1* | 1/2024 | Gan ..................... H04W 48/16 |
| 2024/0064833 A1* | 2/2024 | Jang ........................ H04L 69/14 |
| 2024/0215070 A1* | 6/2024 | Jang ................. H04W 74/0816 |

FOREIGN PATENT DOCUMENTS

| | | |
|---|---|---|
| WO | 2011135392 A1 | 11/2011 |
| WO | 2019050704 A1 | 3/2019 |

OTHER PUBLICATIONS

Monajemi et al., "Simultaneous Transmit and Receive Cap Ability Indication Method for Multi-Link Devices", U.S. Appl. No. 63/009,624, filed Apr. 14, 2020, Total pp. 12 (Year: 2020).*

Naribole et al., "Multi-link Channel Access Discussion", IEEE 802.11-19/1405r7, Oct. 31, 2019 (Year: 2019).*

ITU-R, "Future Technology Trends of Terrestrial IMT systems," Report ITU-R M.2320-0 (International Telecommunication Union), Nov. 30, 2014, 32 pages.

International Search Report and Written Opinion for International Application No. PCT/CN2020/091806, mailed Feb. 24, 2021 (6 pages).

European Search Report issued in EP Patent Application No. 20897477.4, dated Oct. 17, 2023, 6 pages.

Naribole et al., "MLO Constraint Indication and Operating Mode," IEEE 802.11-20/0226r5, Mar. 15, 2020, 28 pages.

Chinese office action issued in CN Patent Application No. 202080086802.2, dated May 22, 2024, 18 pages. English translation included.

* cited by examiner

METHODS AND APPARATUS FOR CHANNEL ACCESS IN A MULTI-LINK WIRELESS SYSTEM

CROSS-REFERENCE TO RELATED APPLICATION

This is a U.S. National Stage Application filed under 35 U.S.C. 371 based on International Patent Application No. PCT/CN2020/091806, filed May 22, 2020, the disclosure of which is incorporated herein by reference in its entirety.

FIELD

The disclosure relates generally to wireless communications and, more particularly, to methods, apparatus and systems for channel access in a multi-link wireless communication.

BACKGROUND

Wireless communication is widely affecting society and people's lives. Many new use cases like factory automations, gaming, emergency communication, virtual reality (VR), augmented reality (AR), etc. require a rapid development of wireless communications to provide low latency and high throughput for such services.

A wireless local area network (WLAN) is a wireless computer network that links two or more devices using wireless communication to form a local area network (LAN) within a limited area such as a home, school, campus or office building. Most modern WLANs are based on IEEE 802.11 standards. A basic service set (BSS) is a basic building block of an IEEE 802.11 LAN. An infrastructure BSS includes a BSS with stations (STAs) associated with an Access Point (AP) to connect to the Internet.

The basic medium access protocol is a distributed coordination function (DCF) that allows for automatic medium sharing through the use of carrier sense multiple access with collision avoidance (CSMA/CA) and a random backoff time. The enhanced distributed channel access (EDCA) provides different priority access for different services. With EDCA, a high-priority traffic has a higher chance of being sent than a low-priority traffic. Channel access and transmission in a multi-link system is an important technology of next generation WLAN, providing high throughput and low latency.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication device is disclosed. The method comprises: transmitting, to a wireless communication node, a first capability information related to simultaneous transmission and reception (STR) capability of the wireless communication device on each basic bandwidth of a pair of wireless links, wherein the pair of wireless links includes a first link and a second link each having a plurality of basic bandwidths, and the first link and the second link have different frequency ranges.

In another embodiment, a method performed by a wireless communication node is disclosed. The method comprises: receiving, from a wireless communication device, a first capability information related to simultaneous transmission and reception (STR) capability of the wireless communication device on each basic bandwidth of a pair of wireless links, wherein the pair of wireless links includes a first link and a second link each having a plurality of basic bandwidths, and the first link and the second link have different frequency ranges.

In another embodiment, a method performed by a wireless communication node is disclosed. The method comprises: transmitting, to a first wireless communication device and a second wireless communication device, a capability information related to simultaneous transmission and reception (STR) capability of the wireless communication node on each basic bandwidth of a pair of wireless links supported by the wireless communication node, wherein the pair of wireless links includes a first link and a second link each having a plurality of basic bandwidths, the first link and the second link have different frequency ranges, the first link connects the wireless communication node with the first wireless communication device, and the second link connects the wireless communication node with the second wireless communication device.

In a different embodiment, a wireless communication node configured to carry out a disclosed method in some embodiment is disclosed. In yet another embodiment, a wireless communication device configured to carry out a disclosed method in some embodiment is disclosed. In still another embodiment, a non-transitory computer-readable medium having stored thereon computer-executable instructions for carrying out a disclosed method in some embodiment is disclosed. The above and other aspects and their implementations are described in greater detail in the drawings, the descriptions, and the claims.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EMBODIMENTS

Figure 1:
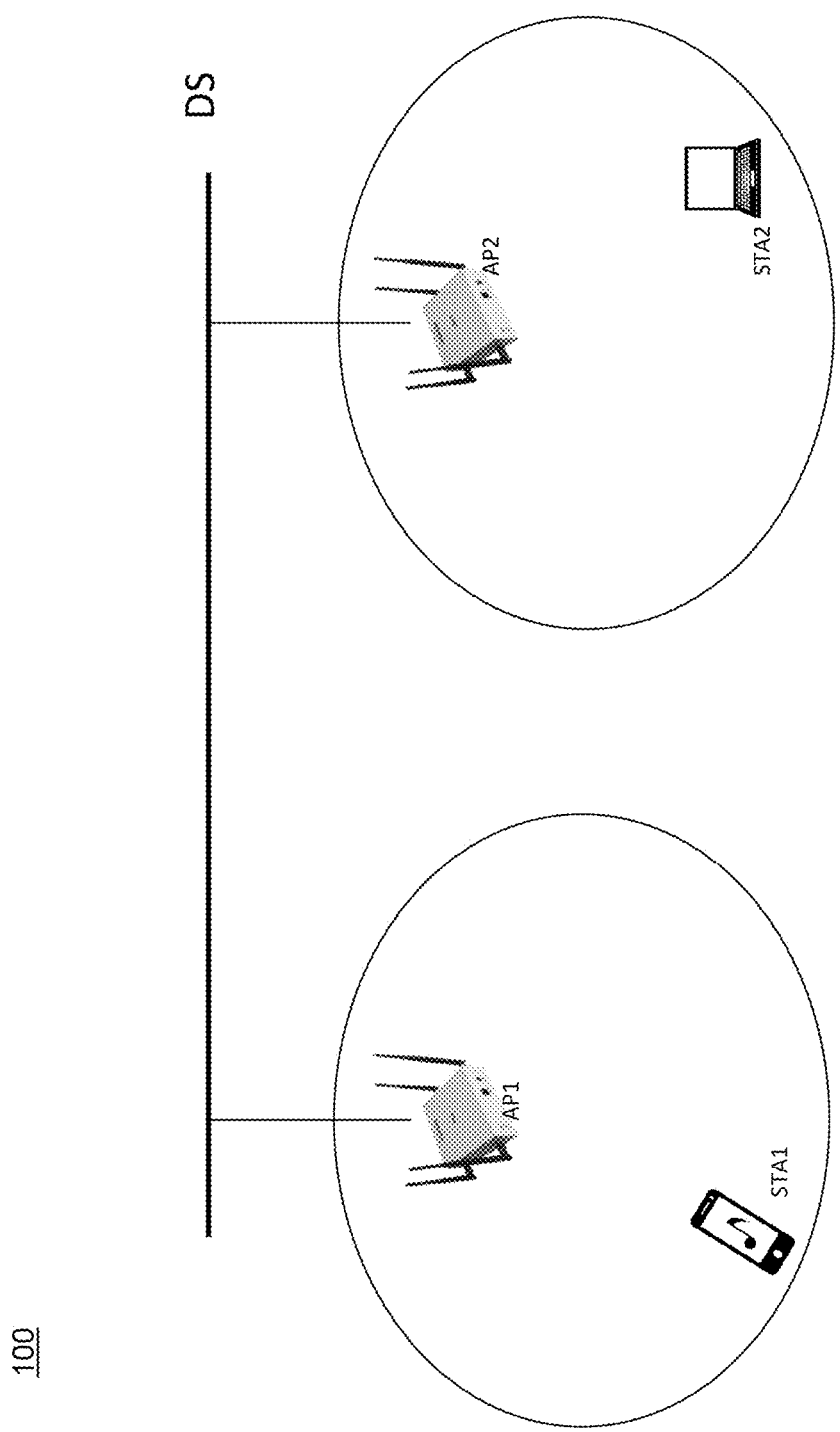
FIG. 1 illustrates an exemplary infrastructure of a communication network in which techniques disclosed herein may be implemented, in accordance with some embodiments of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

In the next generation of wireless communication technology, e.g. the fifth-generation (5G) new radio (NR) network or the next generation of wireless local area network (LAN) technology, a multi-link device (MLD) can communicate with other MLDs on multiple links, to support high throughput and low latency. For example, an MLD may include more than one affiliated station (STA), where each STA works on a respective one link.

The simultaneous transmission and reception (STR) capabilities of the MLDs are different. That is, each MLD may be an STR MLD or a non-STR MLD, depending on whether the MLD supports simultaneous transmission and reception operation. IEEE 802.11 specifies the access protocols of wireless LAN on a license exempt and/or shared spectrum. Main license exempt and/or shared spectrum includes 2.4 GHz, 5 GHz and 6 GHz bands.

Because the distances between the channel center frequencies of the enabled links are different, even if the MLDs are STR MLDs, the operation requirements may be different. When a non-AP MLD is a non-STR device, the device cannot use the existing DCF or EDCA protocol to access to a channel independently among multiple links. The present teaching discloses methods for indicating the STR capability information to differentiate STR capabilities in smaller granularity, with rules and configurations to ensure the fairness of channel access and decrease the cross-channel or cross-link interference.

The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), an AP MLD, a non-terrestrial reception point for satellite/fire balloon/unmanned aerial vehicle (UAV) communication, a radio transceiver in a vehicle of a vehicle-to-vehicle (V2V) wireless network, etc.; while a UE in the present disclosure can be referred to as a terminal and can include, or be implemented as, a mobile station (MS), a station (STA), a non-AP MLD, a terrestrial device for satellite/fire balloon/unmanned aerial vehicle (UAV) communication, a radio transceiver in a vehicle of a vehicle-to-vehicle (V2V) wireless network, etc.

In various embodiments of the present teaching, the two ends of a communication may be described herein as non-limiting examples of "wireless communication node," and "wireless communication device" respectively, which can practice the methods disclosed herein and may be capable of wireless and/or wired communications, in accordance with various embodiments of the present disclosure. For example, in a wireless LAN, a non-AP MLD may communicate with an AP MLD, or communicate with another non-AP MLD; a STA may communicate with an AP, or communicate with another STA.

FIG. 1 illustrates an exemplary infrastructure of a communication network 100 in which techniques disclosed herein may be implemented, in accordance with some embodiments of the present disclosure. As shown in FIG. 1, the exemplary communication network 100 is an infrastructure basic service set (BSS) that includes multiple stations (e.g., STAs and non-AP STAs) and access points (APs) each of which contains one station (STA) and provides station management and access to network. In one example, an AP may be a wireless router; an STA may be a smartphone, a tablet, or a laptop. Different APs may be connected to the Internet via a distributed service (DS).

Figure 2:
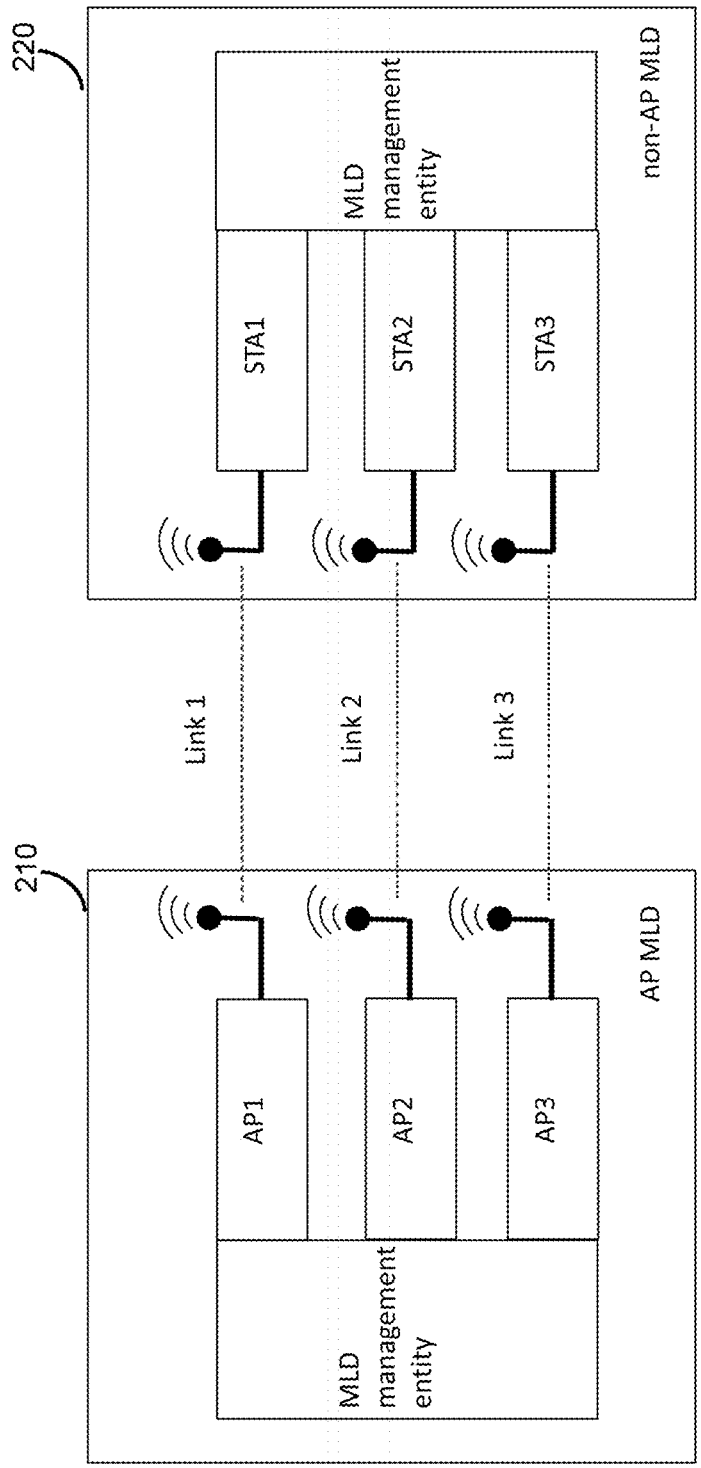
FIG. 2 illustrates block diagrams of an access point (AP) multi-link device (MLD) and a non-AP MLD, in accordance with some embodiments of the present disclosure.

FIG. 2 illustrates block diagrams of an access point (AP) multi-link device (MLD) and a non-AP MLD, in accordance with some embodiments of the present disclosure. As shown in FIG. 2, the AP MLD 210 has more than one affiliated AP (AP1, AP2, AP3); the non-AP MLD 220 has more than one affiliated STA (STA1, STA2, STA3). Each STA works on a respective wireless link (Link 1, Link 2 or Link 3) to communicate with a respective AP of the AP MLD 210. Different links have different frequency ranges in frequency domain.

Figure 3A:
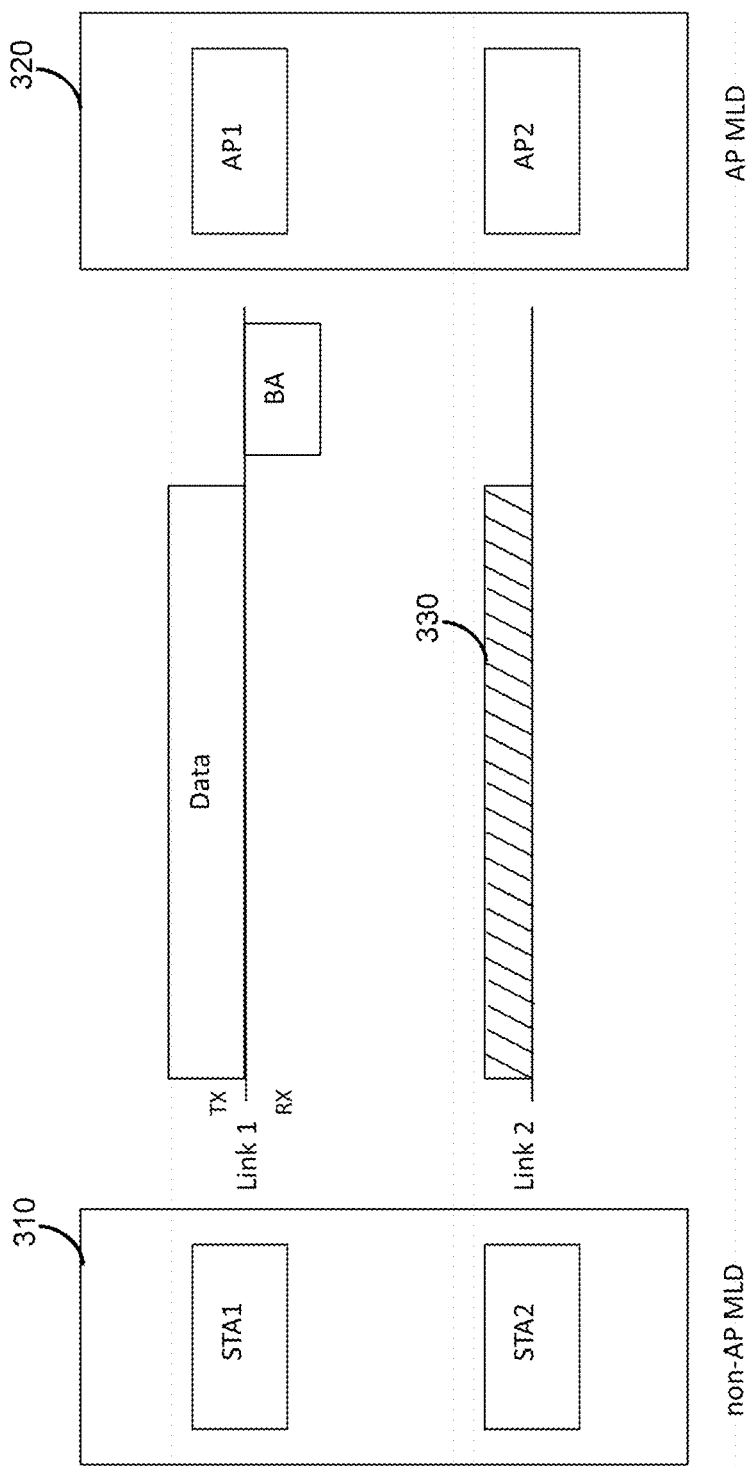
FIG. 3A illustrates an example of transmission power leakage, in accordance with some embodiments of the present disclosure.

FIG. 3A illustrates an example of transmission power leakage, in accordance with some embodiments of the present disclosure. As shown in FIG. 3A, the non-AP MLD 310 can transmit data to the AP MLD 320 and receive block acknowledgement (BA) on link 1. When the non-AP MLD 310 transmits data to the AP MLD 320 on link 1, the transmission power 330 from link 1 can severely interfere the reception of frames on link 2. Because of the power leakage from link1, the transmission on link 1 and the reception on link 2 may not be performed simultaneously and vice versa. In this case, the non-AP MLD 310 is called a constrained MLD or non-STR MLD. If the transmission power leakage from link 1 will not interfere the reception of frames on link 2 and vice versa, the non-AP MLD 310 is called a non-constrained MLD or STR MLD.

Figure 3B:
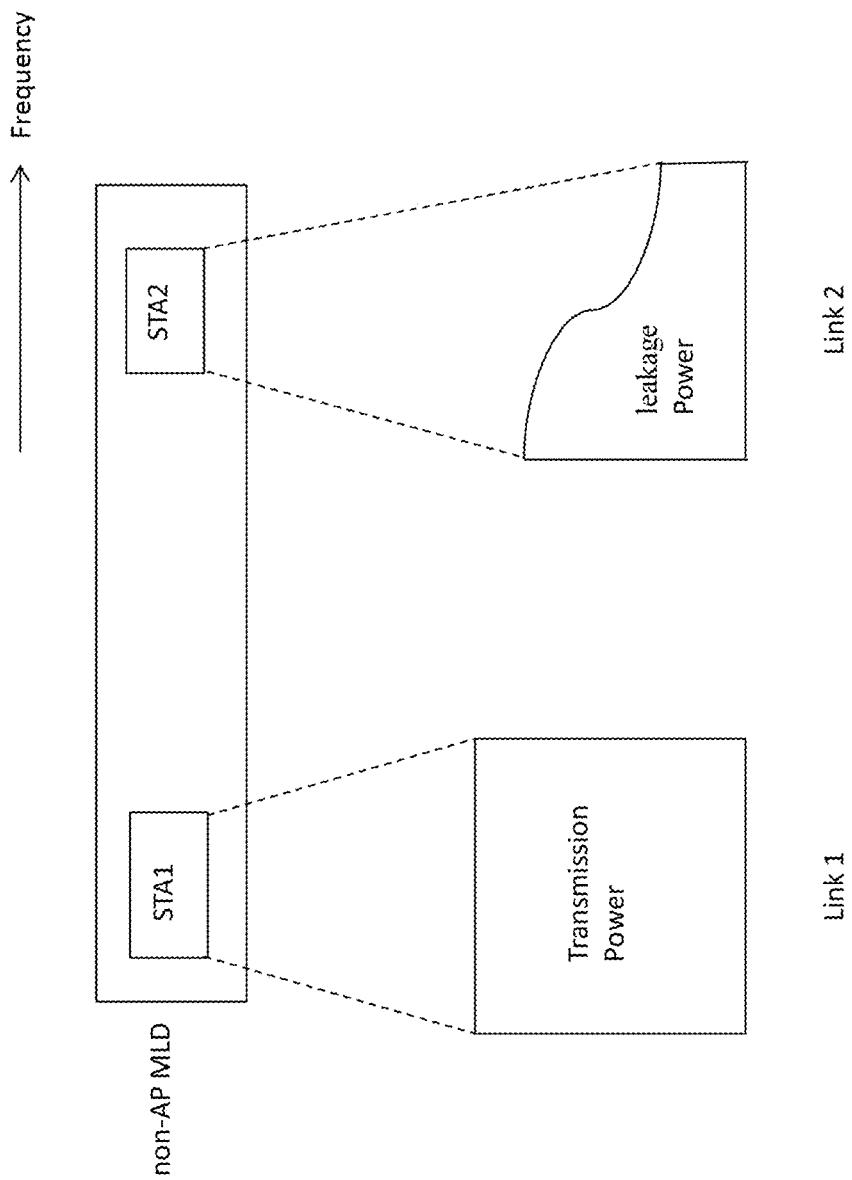
FIG. 3B illustrates an example of the changing of the transmission power leakage in frequency domain, in accordance with some embodiments of the present disclosure.

FIG. 3B illustrates an example of the changing of the transmission power leakage in frequency domain, in accordance with some embodiments of the present disclosure. In a larger bandwidth, the transmission power leakage from link 1 to link 2 is not a constant on all frequency points. As shown in FIG. 3B, link 1 and link 2 are serially located on the frequency spectrum. On link 2, a frequency closer to link 1 is more severely interfered; and a frequency farther away from link 1 is less interfered. The wider the bandwidth of link 2, the more obvious this situation is. In this example, the part of link 2 near to link 1 cannot do STR operation with respect to link 1, but the part of link 2 far away from link 1 can do STR operation with respect to link 1. As such, the STR capability should be indicated at a finer granularity.

Figure 4:
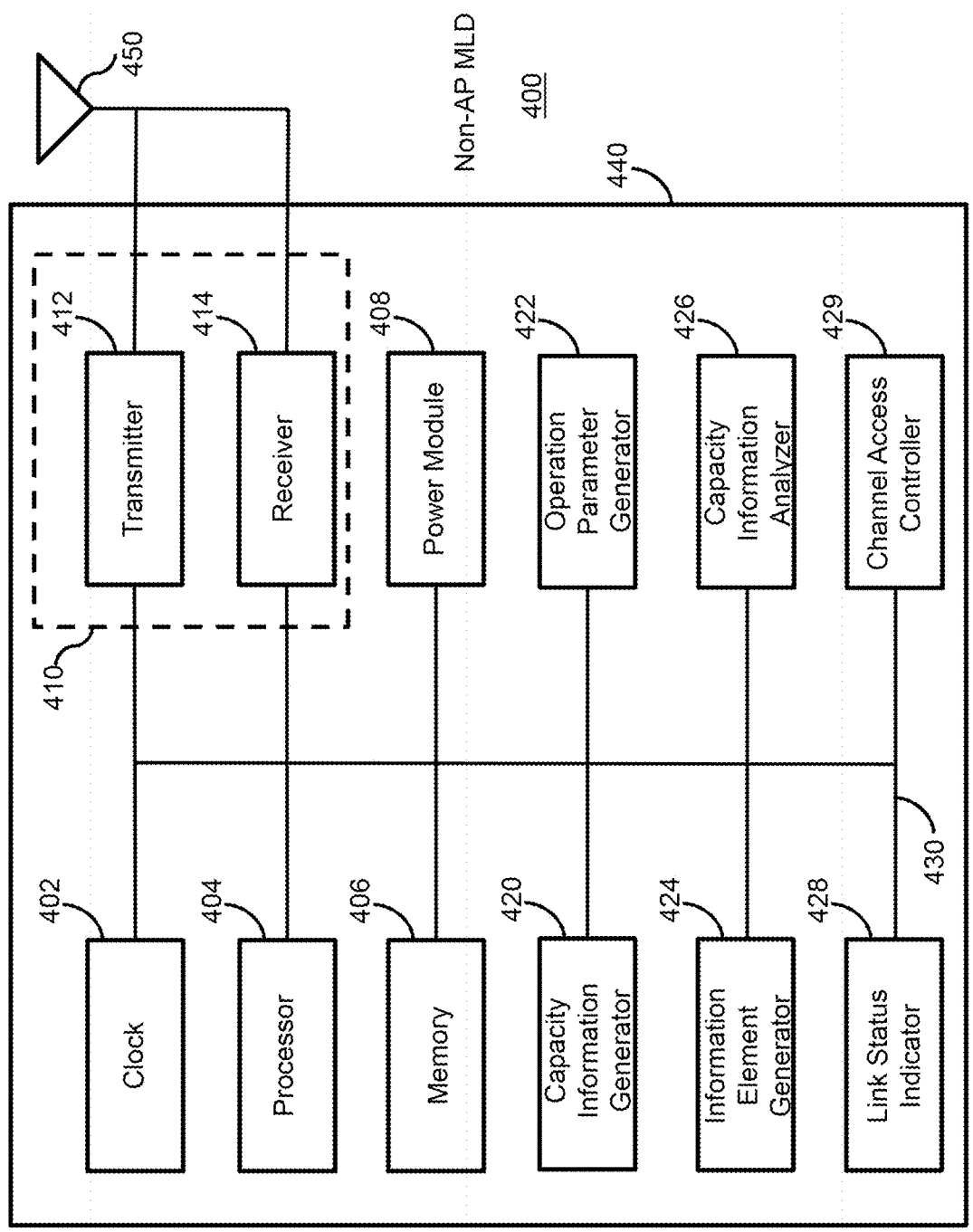
FIG. 4 illustrates a block diagram of a non-AP MLD, in accordance with some embodiments of the present disclosure.

FIG. 4 illustrates a block diagram of a non-AP MLD 400, in accordance with some embodiments of the present disclosure. The non-AP MLD 400 is an example of a device that can be configured to implement the various methods described herein. As shown in FIG. 4, the non-AP MLD 400 includes a housing 440 containing a system clock 402, a processor 404, a memory 406, a transceiver 410 comprising a transmitter 412 and receiver 414, a power module 408, a capability information generator 420, an operation parameter generator 422, an information element generator 424, a capability information analyzer 426, a link status indicator 428 and a channel access controller 429.

In this embodiment, the system clock 402 provides the timing signals to the processor 404 for controlling the timing of all operations of the non-AP MLD 400. The processor 404 controls the general operation of the non-AP MLD 400 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 406, which can include both read-only memory (ROM) and random access memory (RAM), can provide instructions and data to the processor 404. A portion of the memory 406 can also include non-volatile random access memory (NVRAM). The processor 404 typically performs logical and arithmetic operations based on program instructions stored within the memory 406. The instructions (a. k. a., software) stored in the memory 406 can be executed by the processor 404 to perform the methods described herein. The processor 404 and memory 406 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 410, which includes the transmitter 412 and receiver 414, allows the non-AP MLD 400 to transmit and receive data to and from a remote device (e.g., the BS or another UE). An antenna 450 is typically attached to the housing 440 and electrically coupled to the transceiver 410. In various embodiments, the non-AP MLD 400 includes (not shown) multiple transmitters, multiple receivers, and multiple transceivers. In one embodiment, the antenna 450 is replaced with a multi-antenna array 450 that can form a plurality of beams each of which points in a distinct direction. The transmitter 412 can be configured to wirelessly transmit packets having different packet types or functions, such packets being generated by the processor 404. Similarly, the receiver 414 is configured to receive packets having different packet types or functions, and the processor 404 is configured to process packets of a plurality of different packet types. For example, the processor 404 can be configured to determine the type of packet and to process the packet and/or fields of the packet accordingly.

In a wireless communication, the non-AP MLD 400 may include multiple STAs. In one embodiment, the capability information generator 420 can generate a first capability information related to simultaneous transmission and reception (STR) capability of the non-AP MLD 400 on each basic bandwidth of a pair of wireless links. The pair of wireless links includes a first link and a second link each having a plurality of basic bandwidths. The first link and the second link have different frequency ranges. The capability information generator 420 may transmit, via the transmitter 412 to an AP MLD (or another non-AP MLD), the first capability information to indicate the STR capability of the non-AP MLD 400.

In one embodiment, the STR capability of the non-AP MLD 400 indicates whether the non-AP MLD 400 is capable of performing an STR operation on the pair of wireless links. The STR operation comprises, for each basic bandwidth of the first link, at least one of: transmitting information on the basic bandwidth of the first link when the non-AP MLD 400 is simultaneously receiving information on the second link, or receiving information on the basic bandwidth of the first link when the non-AP MLD 400 is simultaneously transmitting information on the second link.

In one embodiment, the first capability information comprises a plurality of bits each of which indicates whether the non-AP MLD 400 is capable of performing an STR operation on a corresponding basic bandwidth of the first link with respect to the second link. In another embodiment, the first capability information indicates either an STR bandwidth or a non-STR bandwidth. The STR bandwidth indicates, among the plurality of basic bandwidths of the first link, a bandwidth range on which the non-AP MLD 400 is capable of performing an STR operation with respect to the second link. The non-STR bandwidth indicates, among the plurality of basic bandwidths of the first link, a bandwidth range on which the non-AP MLD 400 is not capable of performing the STR operation with respect to the second link. The non-STR bandwidth may be closer to the second link in frequency domain than the STR bandwidth.

In one embodiment, the first capability information comprises one single bit indicating: the non-AP MLD 400 is capable of performing an STR operation on every basic bandwidth of the pair of wireless links, or the non-AP MLD 400 is not capable of performing an STR operation on any basic bandwidth of the pair of wireless links. In one embodiment, for each of the first link and the second link, a primary channel is in a basic bandwidth on which the non-AP MLD 400 is capable of performing an STR operation.

In one embodiment, the non-AP MLD 400 and the AP MLD (or another non-AP MLD) are connected by at least three wireless links having different frequency ranges. In that case, the capability information generator 420 may generate and transmit, via the transmitter 412 to the AP MLD (or another non-AP MLD), a capability information related to STR capability of the non-AP MLD 400 on each basic bandwidth of each pair of frequency-adjacent wireless links among the at least three wireless links.

In one embodiment, the first capability information comprises a threshold, such that for each of the plurality of basic bandwidths of the first link, the first capability information indicates whether an STR operation can be performed on the basic bandwidth with respect to the second link, based on a distance between a center frequency of the basic bandwidth and a center frequency of a using bandwidth of the second link. For example, the STR operation can be performed when the distance is greater than the threshold; and the STR operation cannot be performed when the distance is less than the threshold. In other embodiments, a threshold may be compared to a distance between a boundary frequency of the basic bandwidth and a boundary frequency of the using bandwidth of the second link, to determine whether the STR operation can be performed.

The operation parameter generator 422 in this example may generate at least one operation parameter of the pair of wireless links, and transmit, via the transmitter 412 to the AP MLD (or another non-AP MLD), the at least one operation parameter. In one embodiment, the at least one operation parameter comprises information related to at least one of: an STR mode indicating whether simultaneously transmitting and receiving on the pair of links are allowed, a constrained modulation and coding scheme (MCS) indicating a maximum MCS order used by the AP MLD to transmit information on the first link when the AP MLD is receiving information on the second link, a constrained transmission power indicating a maximum transmission power used by the AP MLD to transmit information on the first link when the AP MLD is receiving information on the second link, a constrained transmission bandwidth indicating a maximum transmission bandwidth used by the AP MLD to transmit information on the first link when the AP MLD is receiving information on the second link, a constrained data unit length indicating a maximum data unit length used by the AP MLD to transmit information on the first link when the AP MLD is receiving information on the second link.

The information element generator 424 in this example may generate an information element indicating STR information, and transmit, via the transmitter 412 to the AP MLD (or another non-AP MLD), the information element. In one embodiment, the information element comprises: an element identification (ID) field indicating an ID of the information element; a length field indicating a quantity of octets following the length field in the information element; a first link ID field indicating an ID of the first link; a second link ID field indicating an ID of the second link; an STR bitmap field indicating an STR capability in each basic bandwidth of the first link with respect to the second link; and an STR constraint field indicating at least one constraint parameter for an STR operation on the first link with respect to the second link. In one embodiment, the information element may further comprise: an STR control field indicating, for each constraint parameter, whether the constraint parameter is present in the STR constraint field of the information element.

In another embodiment, the information element further comprises: an element identification (ID) field indicating an ID of the information element; a length field indicating a quantity of octets following the length field in the information element; a first link ID field indicating an ID of the first link; a second link ID field indicating an ID of the second link; a non-STR bandwidth field indicating, among the plurality of basic bandwidths of the first link, a bandwidth range on which the wireless communication device is not capable of performing an STR operation with respect to the second link (or a bandwidth range on which the wireless communication device is capable of performing an STR operation with respect to the second link); and an STR constraint field indicating at least one constraint parameter for an STR operation on the first link with respect to the second link. In one embodiment, the information element may further comprise: an STR control field indicating, for each constraint parameter, whether the constraint parameter is present in the STR constraint field of the information element.

The capability information analyzer 426 in this example may receive, via the receiver 414 from the AP MLD (or another non-AP MLD), and analyze a second capability information related to STR capability of the AP MLD on each basic bandwidth of the pair of wireless links between the non-AP MLD 400 and the AP MLD. In one embodiment, the STR capability of the AP MLD indicates, for each basic bandwidth of the first link, at least one of: whether the AP MLD is capable of transmitting information on the basic bandwidth of the first link when the AP MLD is simultaneously receiving information on the second link; or whether the AP MLD is capable of receiving information on the basic bandwidth of the first link when the AP MLD is simultaneously transmitting information on the second link.

In one embodiment, the non-AP MLD 400 may receive data on the first link from the AP MLD. Then, the link status indicator 428 may generate a first indication indicating that the first link is busy during the receiving. Based on the first indication, the channel access controller 429 may stop the non-AP MLD 400 from a contention for a channel access on a non-STR bandwidth of the second link.

In one embodiment, the non-AP MLD 400 may stop receiving the data on the first link from the AP MLD, e.g. after determining that the data was not sent for the non-AP MLD 400. Then, the link status indicator 428 may generate a second indication indicating that the first link is free. Based on the second indication, the channel access controller 429 may control the transmitter 412 to transmit data to the AP MLD on the non-STR bandwidth of the second link, e.g. when a backoff timer reaches zero.

The power module 408 can include a power source such as one or more batteries, and a power regulator, to provide regulated power to each of the above-described modules in FIG. 4. In some embodiments, if the non-AP MLD 400 is coupled to a dedicated external power source (e.g., a wall electrical outlet), the power module 408 can include a transformer and a power regulator.

The various modules discussed above are coupled together by a bus system 430. The bus system 430 can include a data bus and, for example, a power bus, a control signal bus, and/or a status signal bus in addition to the data bus. It is understood that the modules of the non-AP MLD 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the capability information generator 420. Conversely, each of the modules illustrated in FIG. 4 can be implemented using a plurality of separate components or elements.

Figure 5:
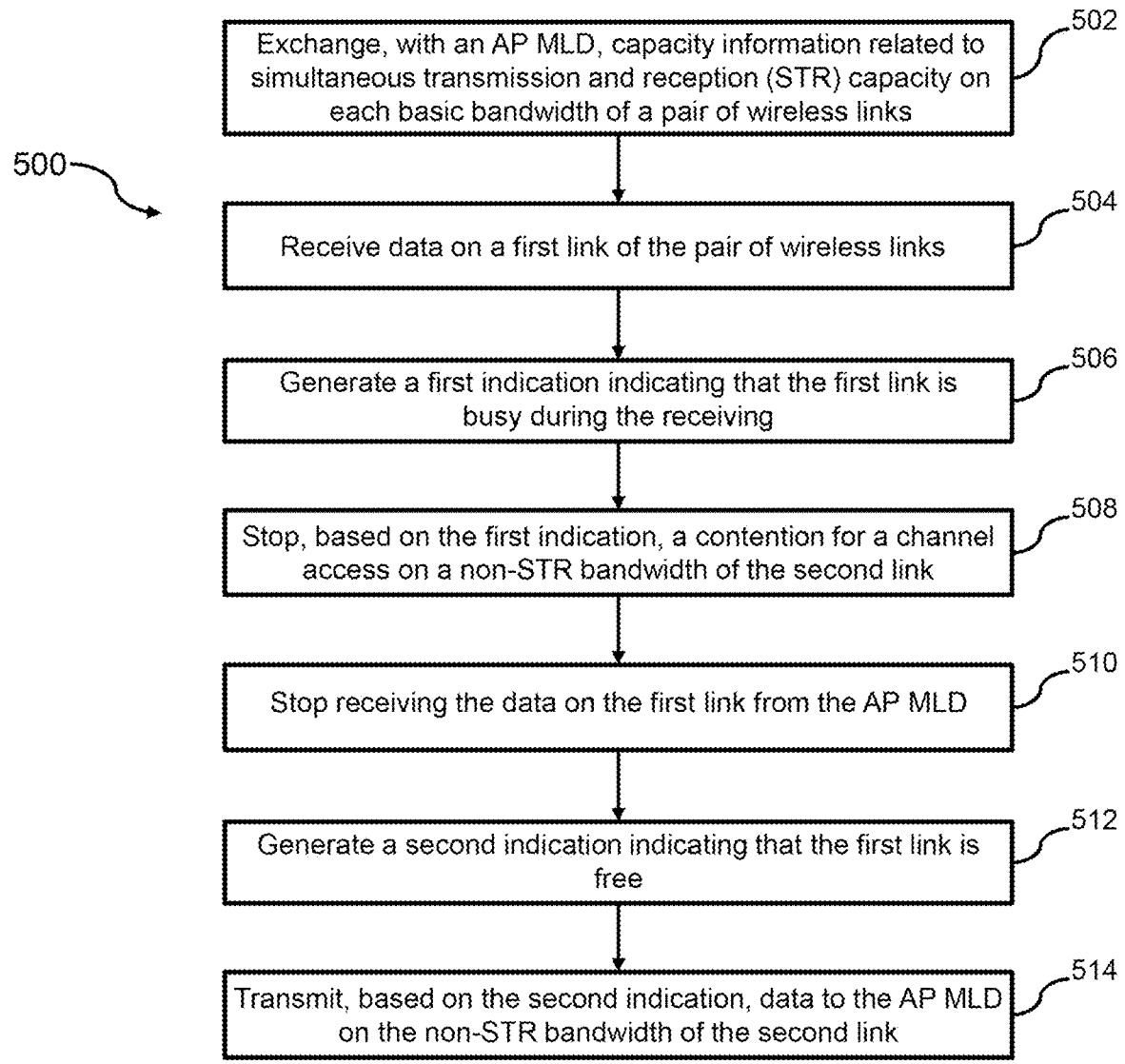
FIG. 5 illustrates a flow chart for a method performed by a non-AP MLD, in accordance with some embodiments of the present disclosure.

FIG. 5 illustrates a flow chart for a method 500 performed by a non-AP MLD, e.g. the non-AP MLD 400 in FIG. 4, for channel access in a multi-link wireless communication, in accordance with some embodiments of the present disclosure. At operation 502, the non-AP MLD exchanges, with an AP MLD, capability information related to simultaneous transmission and reception (STR) capability on each basic bandwidth of a pair of wireless links. This may include transmitting a STR capability information of the non-AP MLD to the AP MLD, and receiving a STR capability information of the AP MLD from the non-AP MLD. At operation 504, the non-AP MLD receives data on a first link of the pair of wireless links. The non-AP MLD generates at operation 506 a first indication indicating that the first link is busy during the receiving. The non-AP MLD stops at operation 508 a contention for a channel access on a non-STR bandwidth of a second link of the pair of wireless links, based on the first indication. Optionally at operation 510, the non-AP MLD stops receiving the data on the first link, e.g. because the non-AP MLD determines that the data is not from the AP MLD. Optionally at operation 512, the non-AP MLD generates a second indication indicating that the first link is free. Optionally at operation 514, the non-AP MLD transmits, based on the second indication, data to the AP MLD on the non-STR bandwidth of the second link. The order of the operations shown in FIG. 5 may be changed according to different embodiments of the present disclosure.

Figure 6:
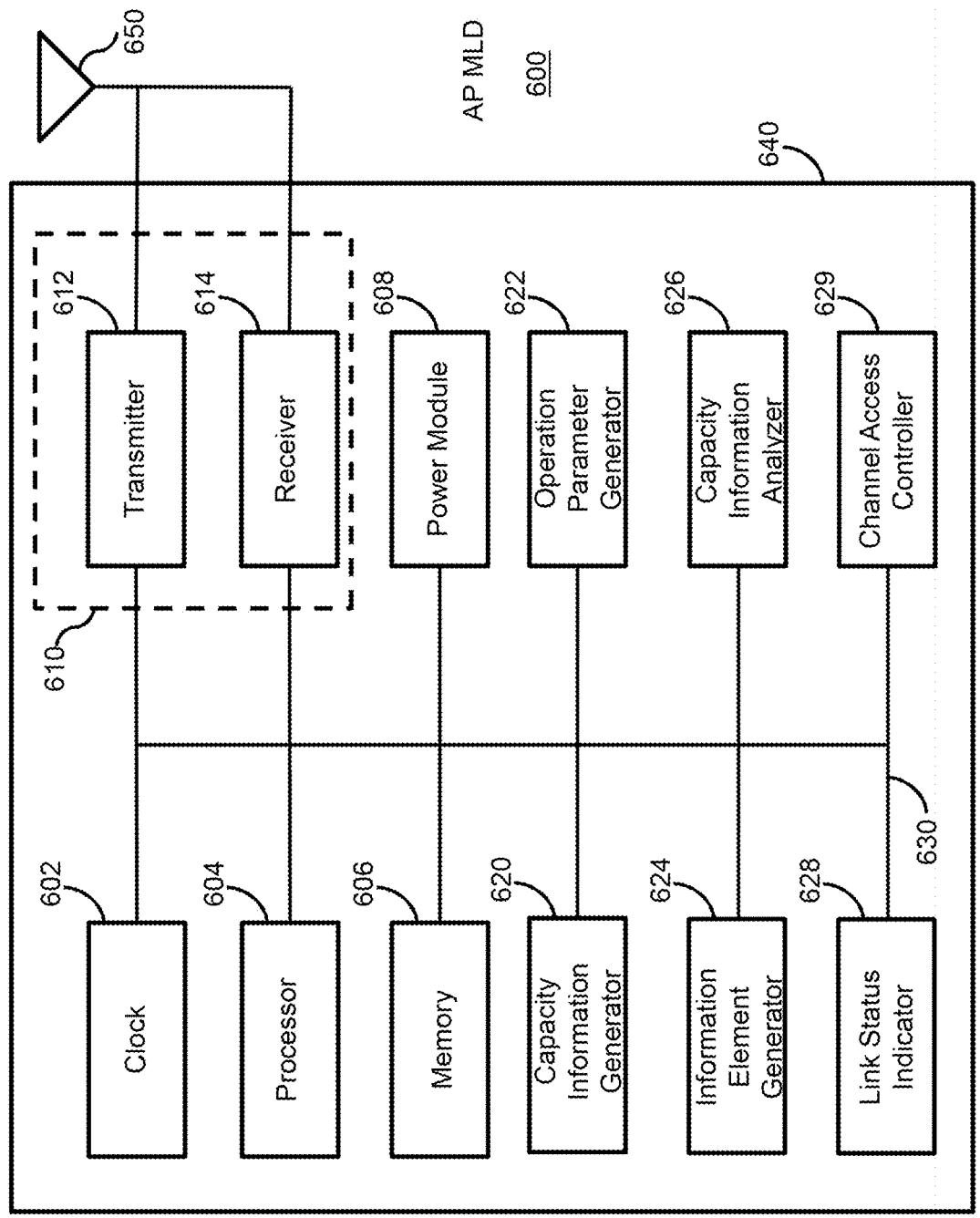
FIG. 6 illustrates a block diagram of an AP MLD, in accordance with some embodiments of the present disclosure.

FIG. 6 illustrates a block diagram of an AP MLD 600, in accordance with some embodiments of the present disclosure. The AP MLD 600 is an example of a device that can be configured to implement the various methods described herein. As shown in FIG. 6, the AP MLD 600 includes a housing 640 containing a system clock 602, a processor 604, a memory 606, a transceiver 610 comprising a transmitter 612 and a receiver 614, a power module 608, a capability information generator 620, an operation parameter generator 622, an information element generator 624, a capability information analyzer 626, a link status indicator 628 and a channel access controller 629.

In this embodiment, the system clock 602, the processor 604, the memory 606, the transceiver 610 and the power module 608 work similarly to the system clock 402, the processor 404, the memory 406, the transceiver 410 and the power module 408 in the non-AP MLD 400. An antenna 650 or a multi-antenna array 650 is typically attached to the housing 640 and electrically coupled to the transceiver 610. In various embodiments, the capability information generator 620, the operation parameter generator 622, the information element generator 624, the capability information analyzer 626, the link status indicator 628 and the channel access controller 629 work similarly to (or symmetrically to) the capability information generator 420, the operation parameter generator 422, the information element generator 424, and the capability information analyzer 426, the link status indicator 428 and the channel access controller 429 in the non-AP MLD 400.

In one embodiment, the AP MLD 600 may include multiple APs. In one embodiment, the capability information analyzer 626 can receive, via the receiver 614 from a non-AP MLD, and analyze a first capability information related to simultaneous transmission and reception (STR) capability of the non-AP MLD on each basic bandwidth of a pair of wireless links. The pair of wireless links includes a first link and a second link each having a plurality of basic bandwidths. The first link and the second link have different frequency ranges.

In one embodiment, the AP MLD 600 may receive data on the second link from the non-AP MLD. The capability information analyzer 626 may determine, based on the first capability information, an STR bandwidth among the plurality of basic bandwidths of the first link. The AP MLD 600 may transmit data on the STR bandwidth of the first link to the non-AP MLD during receiving data on the second link.

In one embodiment, the AP MLD 600 may receive data on the first link from the non-AP MLD. The channel access controller 629 may control the AP MLD 600 to resume a contention for a channel access on the second link during the receiving, and to transmit data to another non-AP MLD on the second link when a backoff timer reaches zero, based on at least one constraint parameter. The at least one constraint parameter may comprise at least one of: a constrained modulation and coding scheme (MCS), a constrained transmission power, a constrained transmission bandwidth, and a constrained data unit length.

In one embodiment, the capability information generator 620 can generate a capability information related to simultaneous transmission and reception (STR) capability of the AP MLD 600 on each basic bandwidth of a pair of wireless links supported by the AP MLD 600. The capability information generator 620 may transmit, via the transmitter 612, the capability information to a first non-AP MLD and a second non-AP MLD (or to a first STA in a first non-AP MLD and a second STA in a second non-AP MLD). The pair of wireless links includes a first link and a second link each having a plurality of basic bandwidths. The first link and the second link have different frequency ranges. The first link connects the AP MLD 600 with the first STA in the first non-AP MLD. The second link connects the AP MLD 600 with the second STA in the second non-AP MLD.

The various modules discussed above are coupled together by a bus system 630. The bus system 630 can include a data bus and, for example, a power bus, a control signal bus, and/or a status signal bus in addition to the data bus. It is understood that the modules of the AP MLD 600 can be operatively coupled to one another using any suitable techniques and mediums.

Although a number of separate modules or components are illustrated in FIG. 6, persons of ordinary skill in the art will understand that one or more of the modules can be combined or commonly implemented. For example, the processor 604 can implement not only the functionality described above with respect to the processor 604, but also implement the functionality described above with respect to the capability information generator 620. Conversely, each of the modules illustrated in FIG. 6 can be implemented using a plurality of separate components or elements.

Figure 7:
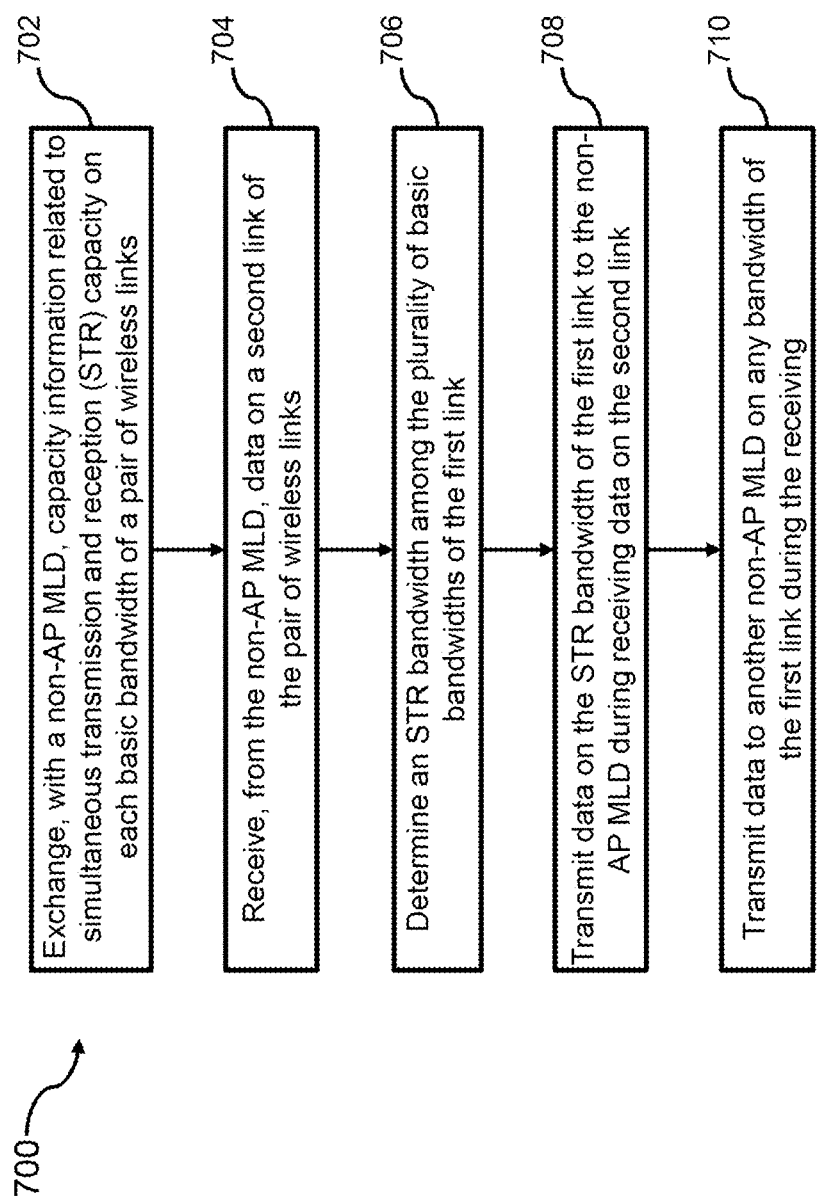
FIG. 7 illustrates a flow chart for a method performed by an AP MLD, in accordance with some embodiments of the present disclosure.

FIG. 7 illustrates a flow chart for a method 700 performed by an AP MLD, e.g. the AP MLD 600 in FIG. 6, for performing channel access in a multi-link wireless communication, in accordance with some embodiments of the present disclosure. At operation 702, the AP MLD exchanges, with a non-AP MLD, capability information related to simultaneous transmission and reception (STR) capability on each basic bandwidth of a pair of wireless links. At operation 704, the AP MLD receives data on a second link of the pair of wireless links from the AP MLD. At operation 706, the AP MLD determines an STR bandwidth among the plurality of basic bandwidths of the first link. The AP MLD transmits at operation 708 data on the STR bandwidth of the first link to the non-AP MLD during receiving data on the second link. Optionally at operation 710, the AP MLD transmits data to another non-AP MLD on any bandwidth of the first link during receiving data on the second link. The order of the operations shown in FIG. 7 may be changed according to different embodiments of the present disclosure.

Different embodiments of the present disclosure will now be described in detail hereinafter. It is noted that the features of the embodiments and examples in the present disclosure may be combined with each other in any manner without conflict.

Figure 8:
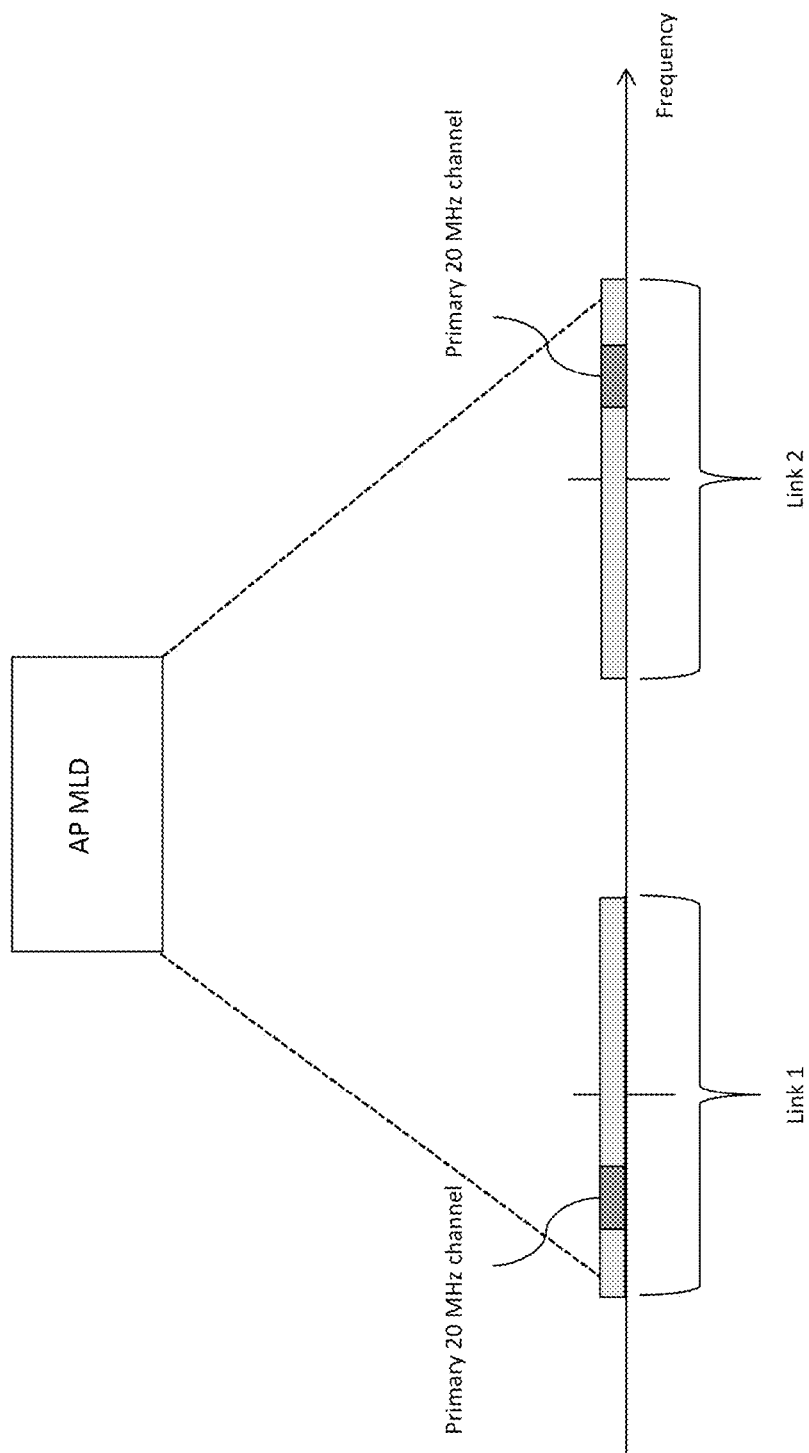
FIG. 8 illustrates an example to select the primary 20 MHz channel when all links are working on continuous frequency, in accordance with some embodiments of the present disclosure.

FIG. 8 illustrates an example of an AP MLD working on two links (link1 and link2). In this example, the channel of link1 is a 160 MHz bandwidth channel and the channel of link 2 is a 160 MHz bandwidth channel. Other channel bandwidth combinations are within the scope of the present teaching as well. In this example, the primary 20 MHz channel of link1 should be selected in a frequency range which is far away from link2; and the primary 20 MHz channel of link2 should be selected in a frequency range which is far away from link1.

Figure 9:
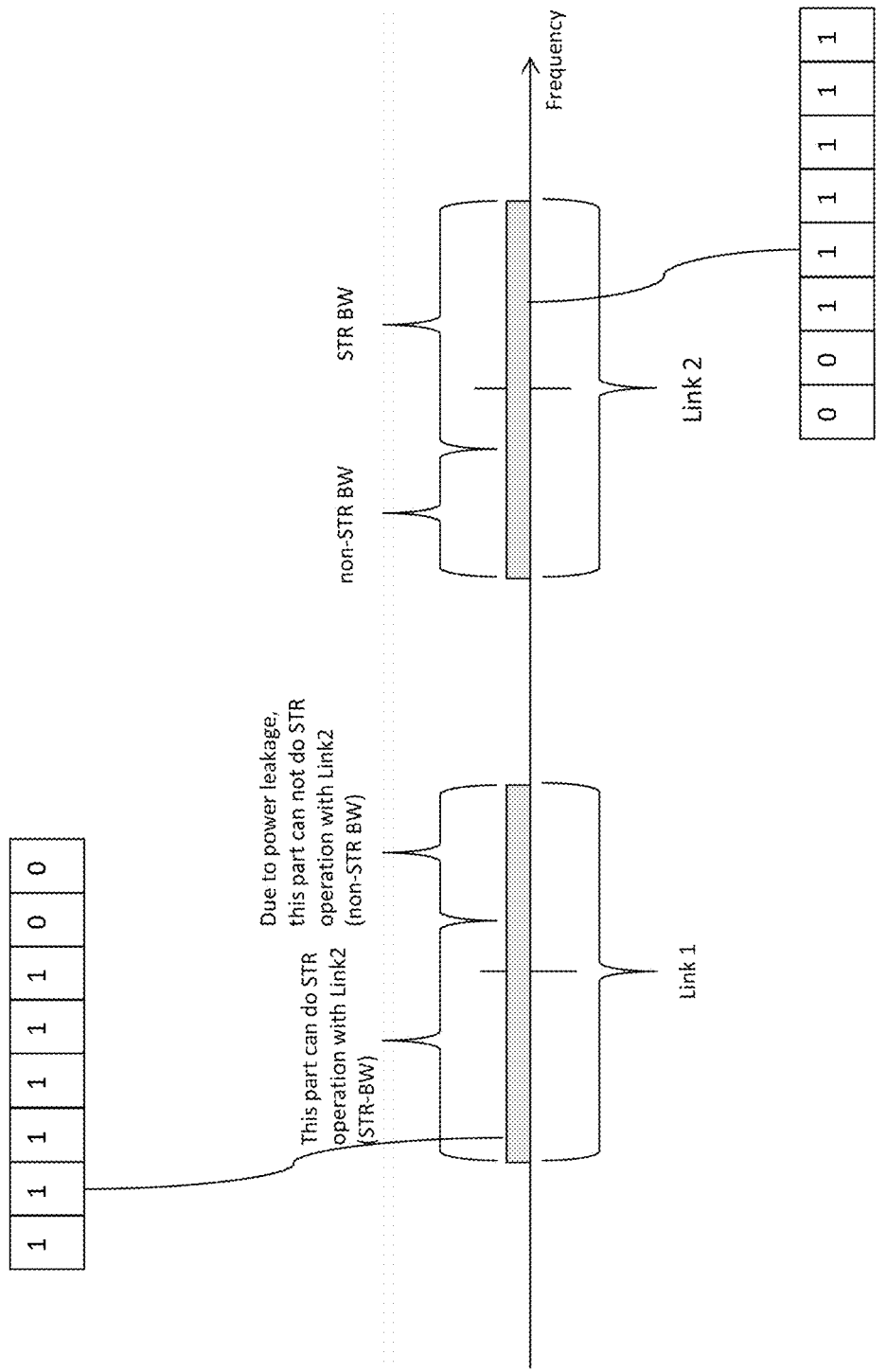
FIG. 9 illustrates an example on how to indicate the simultaneous transmission and reception (STR) capability of one link when all links are working on continuous frequency, in accordance with some embodiments of the present disclosure.

FIG. 9 illustrates an example of an AP MLD or a non-AP MLD working on two links (link1 and link2). The channel of link1 is a 160 MHz bandwidth channel and the channel of link 2 is a 160 MHz bandwidth channel. Other channel bandwidth combinations are within the scope of the present teaching as well. Because of the influence of the transmission power leakage, the AP MLD cannot simultaneously transmit or receive on the upper 40 MHz bandwidth of link1 (this 40 MHz bandwidth can be called non-STR bandwidth (non-STR BW)), but can simultaneously transmit or receive on the lower 120 MHz MHz bandwidth of link1 when the AP MLD is receiving or transmitting on link2 (this 120 MHz bandwidth can be called STR BW).

The AP MLD may indicate where non-STR BW and STR BW of every pair of multi-links are. The AP MLD can broadcast or unicast the STR capability information. The STR capability includes STR capability of every basic bandwidth. As shown in FIG. 9, the AP MLD uses a bitmap to indicate the STR capability of every basic bandwidth. In this case, the basic bandwidth is 20 MHz. As such, the 160 MHz bandwidth channel of link1 needs an 8-bit bitmap, where each bit represents the STR capability of a 20 MHz. If one bit is set to 1, the corresponding 20 MHz can do STR operation with respect to link2. Otherwise, the corresponding 20 MHz cannot do STR operation with respect to link2.

In one embodiment, the AP MLD may broadcast merely the (non-STR) bandwidth of one link on which the STR operation cannot be performed. In the example shown in FIG. 9, the AP MLD indicates that 40 MHz of link1 cannot be used for STR operation, which means the 40 MHz of link1 close to link2 cannot be used for STR operation.

If the interaction of two links of a link pair is equivalent or reciprocal, the AP MLD may broadcast merely the (non-STR) bandwidth on which the STR operation cannot be performed. For example, if the AP MLD indicates the non-STR bandwidth is 40 MHz, it means the AP MLD cannot transmit or receive on the upper 40 MHz bandwidth of link1 when the AP MLD simultaneously receives or transmits on link2; and the AP MLD cannot transmit or receive on the lower 40 MHz bandwidth of link2 when the AP MLD simultaneously receives or transmits on link1.

Each non-AP MLD also reports the STR capability information of every pair of links to an AP MLD accessed by the non-AP MLD. As shown in FIG. 9, the non-AP MLD may also use a bitmap to indicate the STR capability of every basic bandwidth. In this case, the basic bandwidth is 20 MHz. As such, the 160 MHz bandwidth channel of link1 needs an 8-bit bitmap, where each bit represents STR capability of a 20 MHz bandwidth. If one bit is set to 1, the corresponding 20 MHz bandwidth can do STR operation with respect to link2. Otherwise, the corresponding 20 MHz bandwidth cannot do STR operation with respect to link2.

The non-AP MLD may report merely the (non-STR) bandwidth of one link on which the STR operation cannot be performed. For example, the non-AP MLD indicates 40 MHz bandwidth of link1 cannot be used for STR operation, which means the 40 MHz bandwidth of link1 close to link2 cannot be used for STR operation.

If the interaction of two links of a link pair is equivalent or reciprocal, the non-AP MLD may report merely the (non-STR) bandwidth on which the STR operation cannot be performed. For example, if the non-AP MLD indicates the non-STR bandwidth is 40 MHz, which means the non-AP MLD cannot transmit or receive on the upper 40 MHz bandwidth of link1 when the non-AP MLD simultaneously receives or transmits on link2; and the AP MLD cannot transmit or receive on the lower 40 MHz bandwidth of link2 when the non-AP MLD simultaneously receives or transmits on link1.

After the AP MLD and non-AP MLDs exchange the STR capability information of every pair of links, the AP MLD and non-AP MLDs can schedule the channel access and transmission more efficiently, and use applicable channel bandwidth for STR operation to enhance network throughput and reduce channel access and transmission delay.

Figure 10:
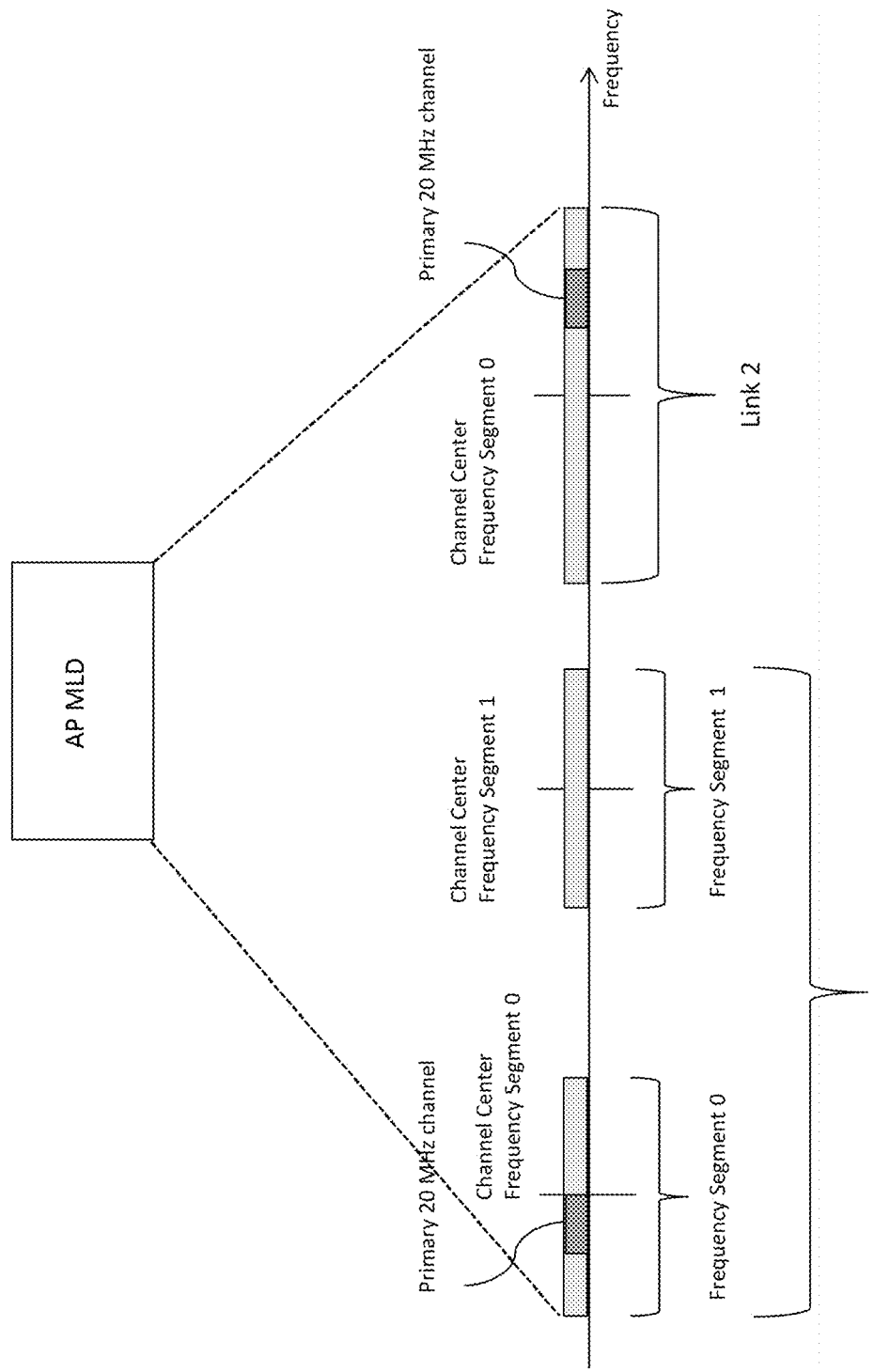
FIG. 10 illustrates an example on how to select the primary 20 MHz channel when some links are working on non-continuous frequency, in accordance with some embodiments of the present disclosure.

FIG. 10 illustrates an example of an AP MLD working on two links (link1 and link2). The channel of link2 is a 320 MHz bandwidth channel and the channel of link1 is a 160+160 MHz bandwidth channel. In this case, the primary 20 MHz channel of link1 should be selected in a frequency range which is far away from link2; and the primary 20 MHz channel of link2 should be selected in a frequency range which is far away from link1.

For 80+80 MHz, 160+80 MHz, or 160+160 MHz BSS bandwidth, the Channel Center Frequency Segment 0 indicates the channel center frequency index for the 80 MHz or 160 MHz channel of frequency segment 0 on which the BSS operates. For 80+80 MHz, 160+80 MHz, or 160+160 MHz BSS bandwidth, the Channel Center Frequency Segment 1 indicates the channel center frequency index for the 80 MHz or 160 MHz channel of frequency segment 1 on which the BSS operates.

In one embodiment, the AP MLD broadcasts the STR capability information to indicate STR capability of every basic bandwidth. The AP MLD uses a bitmap to indicate the STR capability of each basic bandwidth. In this example, the basic bandwidth is 20 MHz. As such, the 320 MHz channel of link2 needs a 16-bit bitmap, each bit representing STR capability of a 20 MHz bandwidth. If one bit is set to 1, the corresponding 20 MHz bandwidth can do STR operation with respect to link1. Otherwise, the corresponding 20 MHz bandwidth cannot do STR operation with respect to link1. If the AP MLD can perform STR operation between link1 and link2, every bit of the 16-bit bitmap is set to 1.

Figure 11:
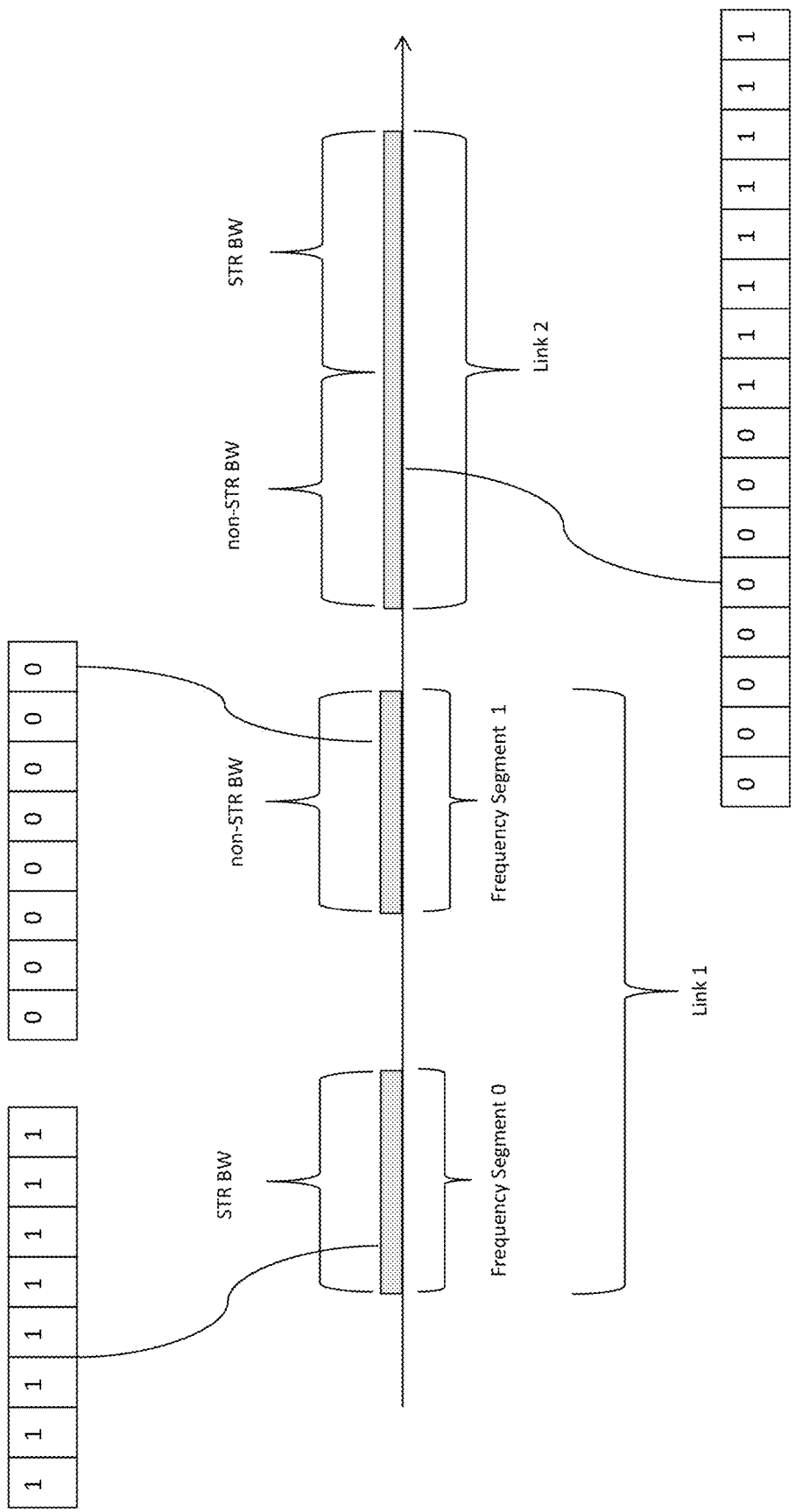
FIG. 11 illustrates an example on how to indicate the STR capability of one link when some links are working on non-continuous frequency, in accordance with some embodiments of the present disclosure.

In one embodiment, the non-AP MLD reports the STR capability information of every pair of multi-links. As shown in FIG. 11, the non-AP MLD uses a bitmap to indicate the STR capability of every basic bandwidth. In this example, the basic bandwidth is 20 MHz bandwidth. As such, the 320 MHz bandwidth channel of link2 needs a 16-bit bitmap, each bit representing STR capability of a 20 MHz bandwidth. If one bit is set to 1, the corresponding 20 MHz bandwidth can perform STR operation with respect to link1. Otherwise, the corresponding 20 MHz cannot do STR operation with respect to link1.

In one embodiment, the non-AP MLD uses a 16-bit bitmap to indicate the STR capability of link1 with respect to link2 for a 320 MHz (160+160 MHz) bandwidth channel. In this example, the frequency segment 1 cannot be used for STR operation when non-AP MLD is simultaneously transmitting or receiving on link2; but the frequency segment 0 can be used for STR operation when non-AP MLD is simultaneously transmitting or receiving on link2. As such, the 16-bit bitmap is set to 1111111100000000. The non-AP MLD also uses a 16-bit bitmap to indicate the STR capability of link2 with respect to link1. Because the 160 MHz bandwidth of link2 close to link1 cannot be used for STR operation, the 16-bit bitmap is set to 0000000011111111.

In one embodiment, the non-AP MLD may report only the partial bandwidth of one link on which the STR operation cannot be performed. For example, the non-AP MLD indicates 160 MHz bandwidth of link1 cannot be used for STR operation, which means the 160 MHz bandwidth of link1 close to the channel of link2 cannot be used for STR operation.

If the interaction of two links of a link pair is equivalent or reciprocal, the non-AP MLD may report only the bandwidth on which the STR operation cannot be performed. For example, if the non-AP MLD indicates the bandwidth is 160 MHz, it means the non-AP MLD cannot transmit or receive on the upper 160 MHz bandwidth of link1 when the non-AP MLD simultaneously receives or transmits on link2; and the non-AP MLD cannot transmit or receive on the lower 160 MHz bandwidth of link2 when the non-AP MLD simultaneously receives or transmits on link1.

In various embodiments, there are two special cases of bit indication to reduce the overhead. In a first case, all frequency segments of the paired links cannot perform the STR operation. In a second case, all frequency segments of the paired links can perform the STR operation. In both cases, the non-AP MLD may indicate the STR capability using one single bit.

Figure 12:
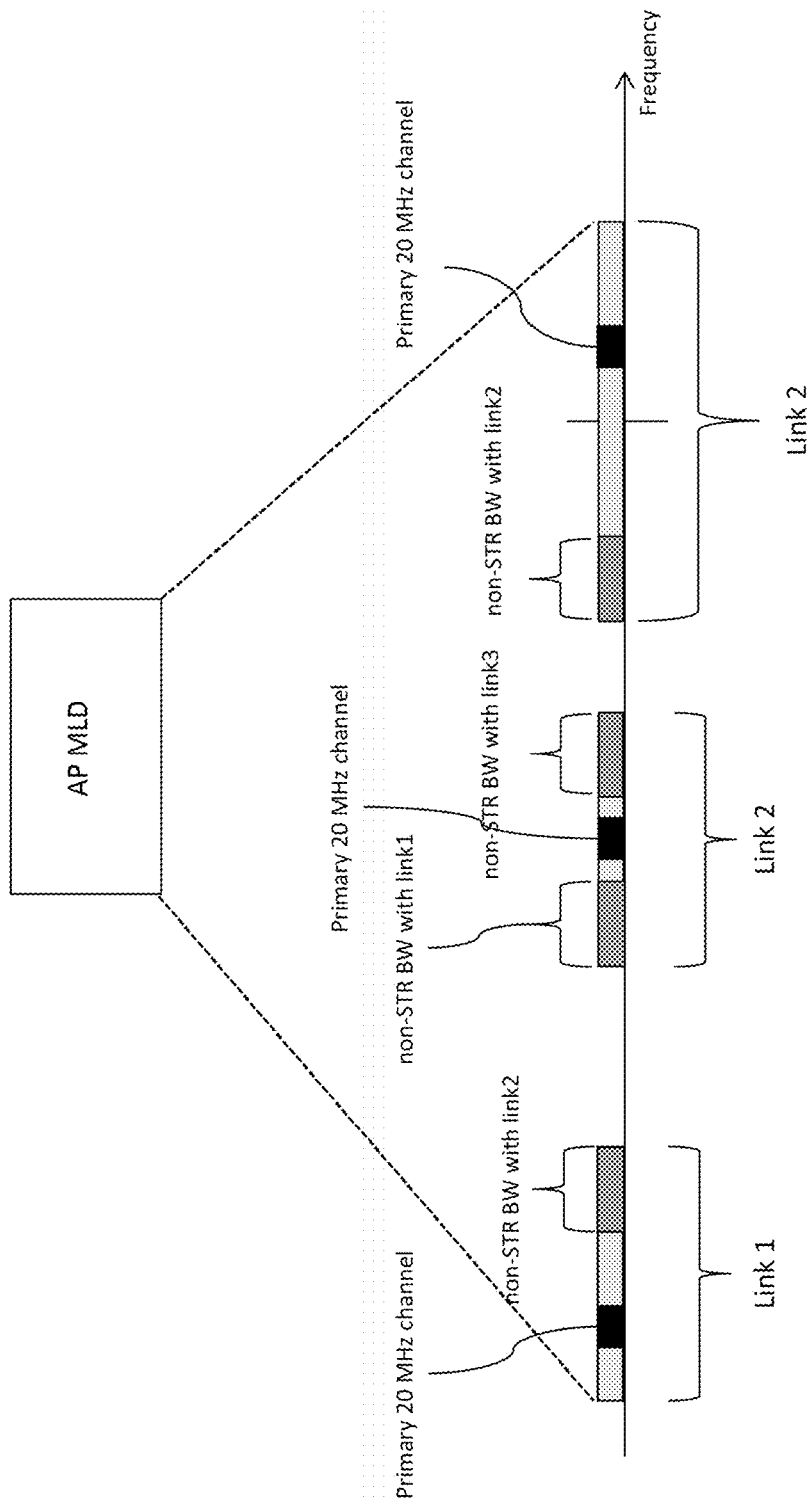
FIG. 12 illustrates an example on how to indicate the STR capability and primary 20 MHz channel when the number of links is greater than two, in accordance with some embodiments of the present disclosure.

FIG. 12 illustrates an example of multi-link operation for an AP MLD working on three links (link1, link2 and link3). Link2 is between link1 and link3 in frequency domain as shown in FIG. 12. In this example, link2 has both a non-STR BW with link1 and a non-STR BW with link3. The primary 20 MHz channel of link2 should be selected in the channel which is indicated by STR BW, which is located between the non-STR BW with link1 and the non-STR BW with link3 in this example. The AP MLD or non-AP MLD can enhance network throughput and reduce network delay through the accurate capability indication between every pair of frequency segments. Based on the accurate STR capability report, the AP MLD or non-AP MLD can enhance network throughput and reduce channel access and transmission delay.

Figure 13:
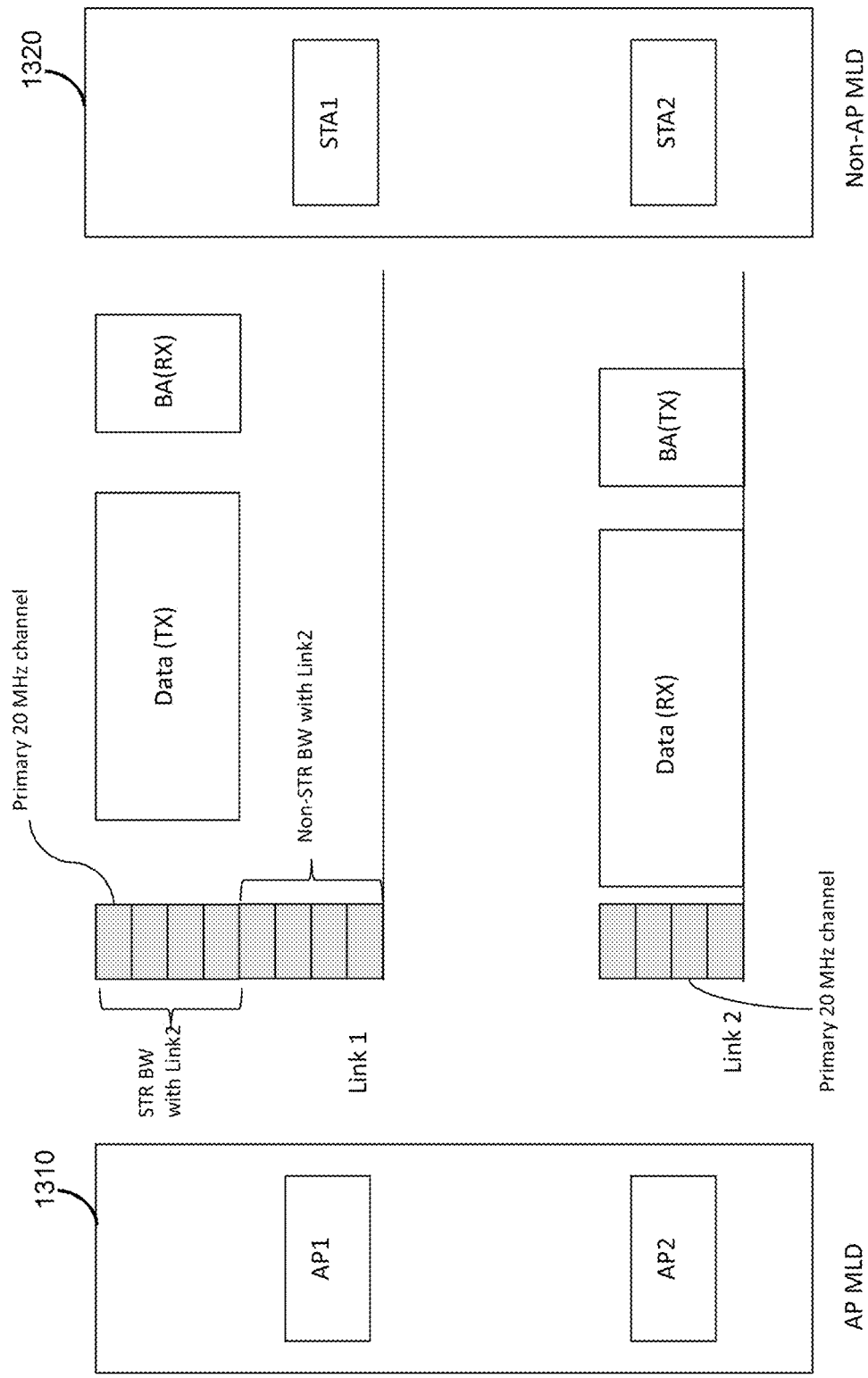
FIG. 13 illustrates an example for a non-AP MLD to access to the channel based on accurate STR capability report, in accordance with some embodiments of the present disclosure.

FIG. 13 illustrates an example of channel access of non-STR non-AP MLD using the accurate STR capability report. An AP MLD 1310 and a non-AP MLD 1320 work on two links (link1 and link2). The AP MLD 1310 is a STR AP MLD that can simultaneously transmit or receive on link1, while the AP MLD 1310 is receiving or transmitting on link2. But the non-AP MLD 1320 can simultaneously transmit or receive only on partial bandwidth of link1 while the non-AP MLD 1320 is receiving or transmitting on link2. After the non-AP MLD 1320 sends the accurate STR capability report to the AP MLD 1310, the non-AP MLD 1310 can transmit and receive on the two links at the same time. As shown in FIG. 13, when the AP MLD 1310 receives data from the non-AP MLD 1320 on link2, the AP MLD 1310 can determine, based on the STR capability report, a bandwidth (i.e. STR BW with respect to link2) in link1. As such, the AP MLD 1310 can transmit data on the STR BW of link1 to the non-AP MLD 1320, while the AP MLD 1310 receives data from the non-AP MLD 1320 on link2.

For ease of operation, the power leakage may be quantified to a certain extent. For example, the channel center frequency of link 1 is A, the channel center frequency of the link2 is B. Then if a distance between the two channel center frequencies is less than a first threshold, i.e. |A−B|<Threshold 1, the power leakage from link1 would severely interfere the reception of frames on link 2, which means the MLD is non-STR MLD.

If the distance between the two channel center frequencies is greater than the first threshold but less than a second threshold, i.e. Threshold 1<|A−B|<Threshold 2, the power leakage from link1 would interfere the reception of frames. But with restriction on some operation parameters on the links, the MLD can also simultaneously transmit on one link and receive on the other link.

If the distance between the two channel center frequencies is greater than the second threshold, i.e. |A−B−>Threshold 2, the power leakage from one link will not interfere the reception of frames on other links.

An AP MLD may indicate the maximum value of self interference and/or the minimum value of self interference for every pair of links in a beacon, probe response, fast initial link setup (FILS) discovery frame or other frames. The AP MLD may broadcast the operation parameters of each pair of links, and the frequency information of each pair of links.

When a non-AP MLD associates or re-associates with an AP MLD, the non-AP MLD may include the maximum value of self interference and/or the minimum value of self interference for each pair of links in the (re) association request frame. The maximum value of self interference may be measured based on the maximum transmission power; and the minimum value of self interference may be measured based on the minimum transmission power. The maximum value of self interference and/or the minimum value of self interference for each pair of links can also be included in probe request or other frame sent by the non-AP MLD.

The non-AP MLD may get the self interference status based on the AP MLD which the non-AP MLD wants to associate with. The non-AP MLD includes the operation parameters of every pair of links in (re) association request frame, where the operation parameters may include: e.g. STR mode, constrained modulation and coding scheme, constrained transmission power, constrained transmission bandwidth, and/or constrained physical layer convergence procedure (PLCP) protocol data unit (PPDU) length.

The STR mode indicates the mode of simultaneously transmitting and receiving on a pair of links. There are two modes: (1) simultaneously transmitting and receiving on a pair of links are allowed; and (2) simultaneously transmitting and receiving on a pair of links are not allowed.

The constrained modulation and coding scheme indicates a maximum modulation and coding scheme. The AP MLD is receiving a packet on one link, if the AP MLD wants to transmit other packets on the peer or paired link simultaneously, the modulation and coding scheme used by the packet transmitted by the AP MLD cannot be greater than the value indicated by the constrained modulation and coding scheme.

The constrained transmission power indicates a maximum transmission power. If an AP MLD is receiving a packet on one link, and if the AP MLD wants to transmit another packet on the peer or paired link simultaneously, the transmission power of the packet transmitted by the AP MLD cannot be higher than the value indicated by the constrained transmission power.

The constrained transmission bandwidth indicates a maximum transmission bandwidth. If an AP MLD is receiving a packet on one link, and wants to transmit another packet on the peer or paired link simultaneously, the transmission bandwidth of the packet transmitted by the AP MLD cannot be higher than the value indicated by the constrained transmission bandwidth.

The constrained PPDU length indicates a maximum transmission length. If an AP MLD is receiving a packet on one link and wants to transmit another packet on the peer or paired link simultaneously, the PPDU length of the packet transmitted by the AP MLD cannot be longer than the value indicated by the constrained PPDU length.

The non-AP MLD can also update the operation parameters after the association or re-association. The non-AP MLD can update the operation parameters by sending other management frames.

To support higher throughput, non-AP STA and AP may support for 80+80 MHz, 160+80 MHz, 160+160 MHz or other bandwidth combinations. For example, if an AP establishes a BSS with the bandwidth set to 160+160 MHz, the AP MLD may broadcast the channel information, which includes Channel Width, Channel Center Frequency Segment 0 and Channel Center Frequency Segment 1. The Channel Width can indicate the BSS bandwidth.

Figure 14:
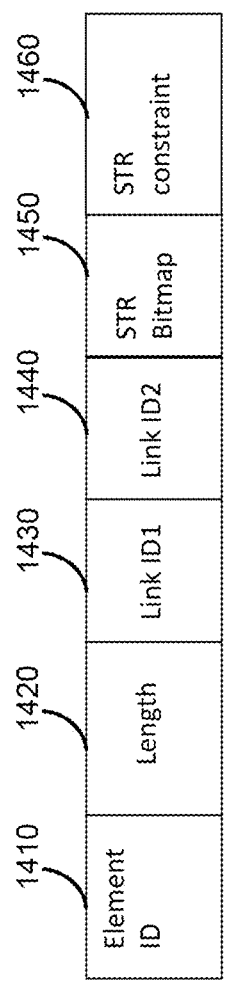
FIG. 14 illustrates an example of an element indicating STR information, in accordance with some embodiments of the present disclosure.

FIG. 14 illustrates an information element indicating STR information. Each element is identified by the contents of the Element ID 1410. The Length field 1420 specifies the number of octets following the Length field 1420 in the information element. Link ID1 1430 and Link ID2 1440 are the identifications of a pair of two links. Link ID1 1430 identifies a link which is the primary link. Link ID2 1440 identifies a link which is a reference link. The STR bitmap field 1450 describes the STR capability in the unit of basic bandwidth of the link identified by Link ID1 1430 with respect to the link identified by Link ID2 1440. The STR constraint field 1460 describes the constraint for the STR operation of the link identified by Link ID1 1430. Each non-AP MLD can generate and report multiple information elements, each of which corresponds to a pair of links to be used by the non-AP MLD.

Figure 15:
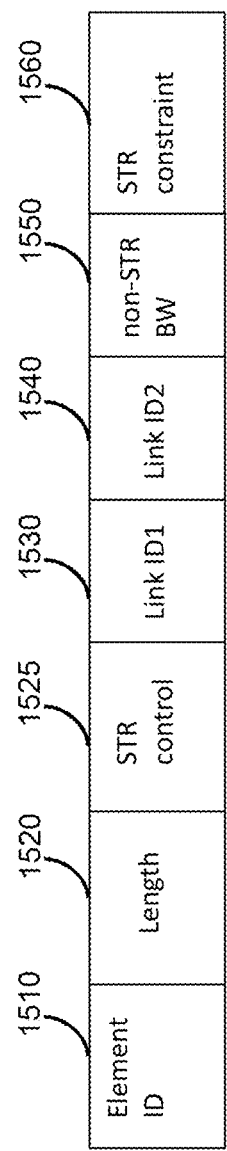
FIG. 15 illustrates another example of an element indicating STR information, in accordance with some embodiments of the present disclosure.

FIG. 15 illustrates another information element indicating STR information. Each element is identified by the contents of the Element ID 1510. The Length field 1520 specifies the number of octets following the Length field 1520. Link ID1 1530 and Link ID2 1540 are the identifications of a pair of two links. Link ID1 1530 identifies a link which is the primary link. Link ID2 1540 identifies a link which is a reference link. The non-STR BW field 1550 describes the bandwidth of the link identified by Link ID1 1530 in which the STR operation cannot be performed with respect to the link identified by Link ID2 1540. The STR constraint field 1560 describes the constraint for the STR operation of the link identified by Link ID1 1530. The STR control field 1525 is a bitmap to indicate, for each constraint parameter, whether the constraint parameter is present in the STR constraint field 1560 of the information element. Each non-AP MLD can generate and report multiple information elements, each of which corresponds to a pair of links to be used by the non-AP MLD and may have same or different formats.

Figure 16:
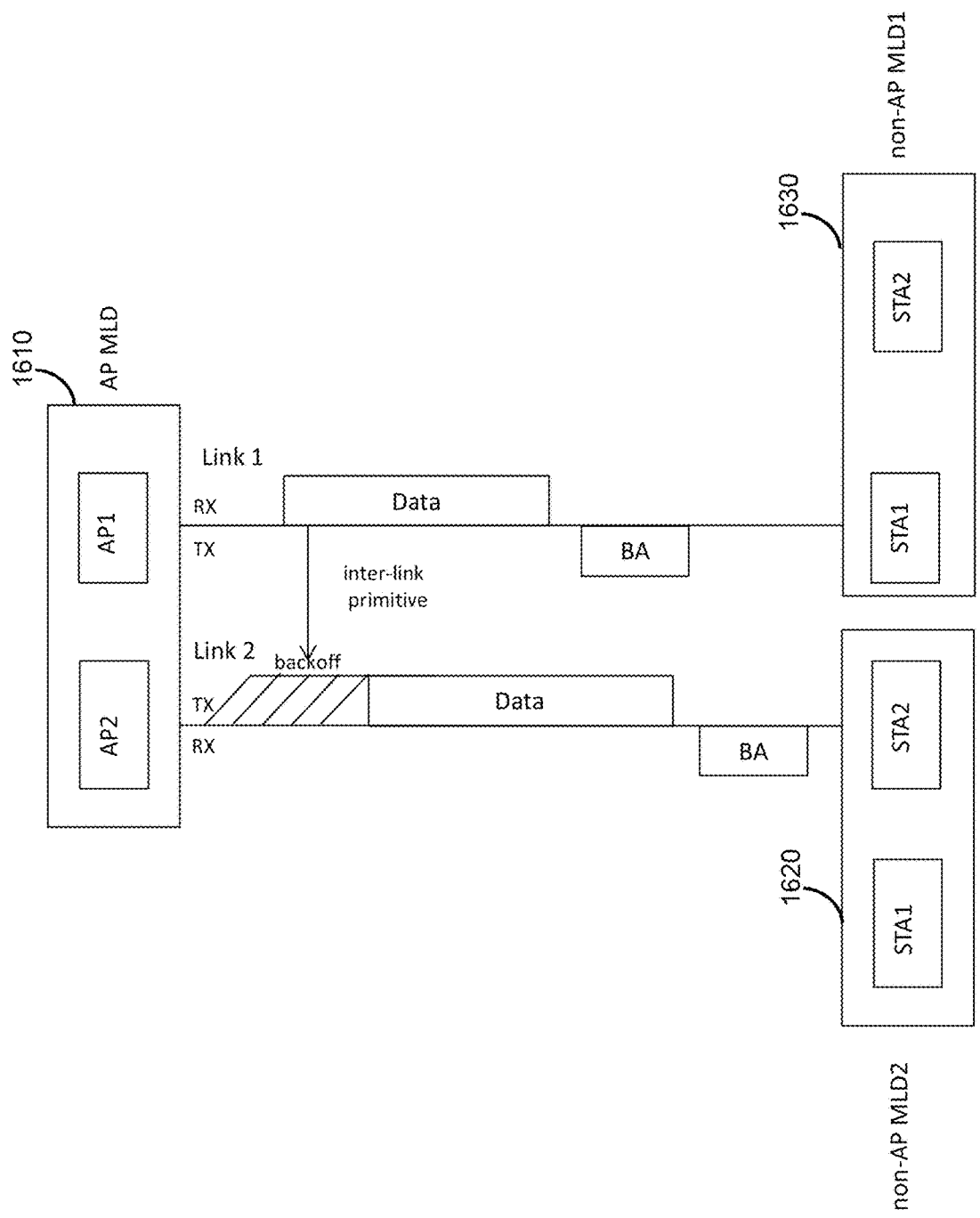
FIG. 16 illustrates an example of a multi-link operation for an AP MLD, in accordance with some embodiments of the present disclosure.

FIG. 16 illustrates an example of multi-link operation for an AP MLD. As shown in FIG. 16, the AP MLD 1610 has two affiliated stations (AP1 and AP2); each non-AP MLD 1620, 1630 also has two affiliated stations (STA1 and STA2). Each non-AP MLD is a non-STR non-AP MLD. STA1 of the non-AP MLD1 1630 is associated with AP1 and communicates with AP1 on link 1. STA2 of the non-AP MLD2 1620 is associated with AP2 and communicates with AP2 on link 2. STA1 of the non-AP MLD1 1630 transmits Data to AP1 on link1. When AP1 and AP2 are contending the channel, the AP1 is triggered the reception of packet on link1. In this situation, the reception on link1 cannot stop contending the channel access on link2. AP2 continues to contend the channel access. The transmission on link2 can start when a backoff timer reaches 0. But in this example, AP2 cannot transmit a packet to STA2 of the non-AP MLD1 1630, unless AP2 restricts the transmission parameters with the constraint parameters, such as constrained transmission power, transmission bandwidth or other limitations.

Figure 17:
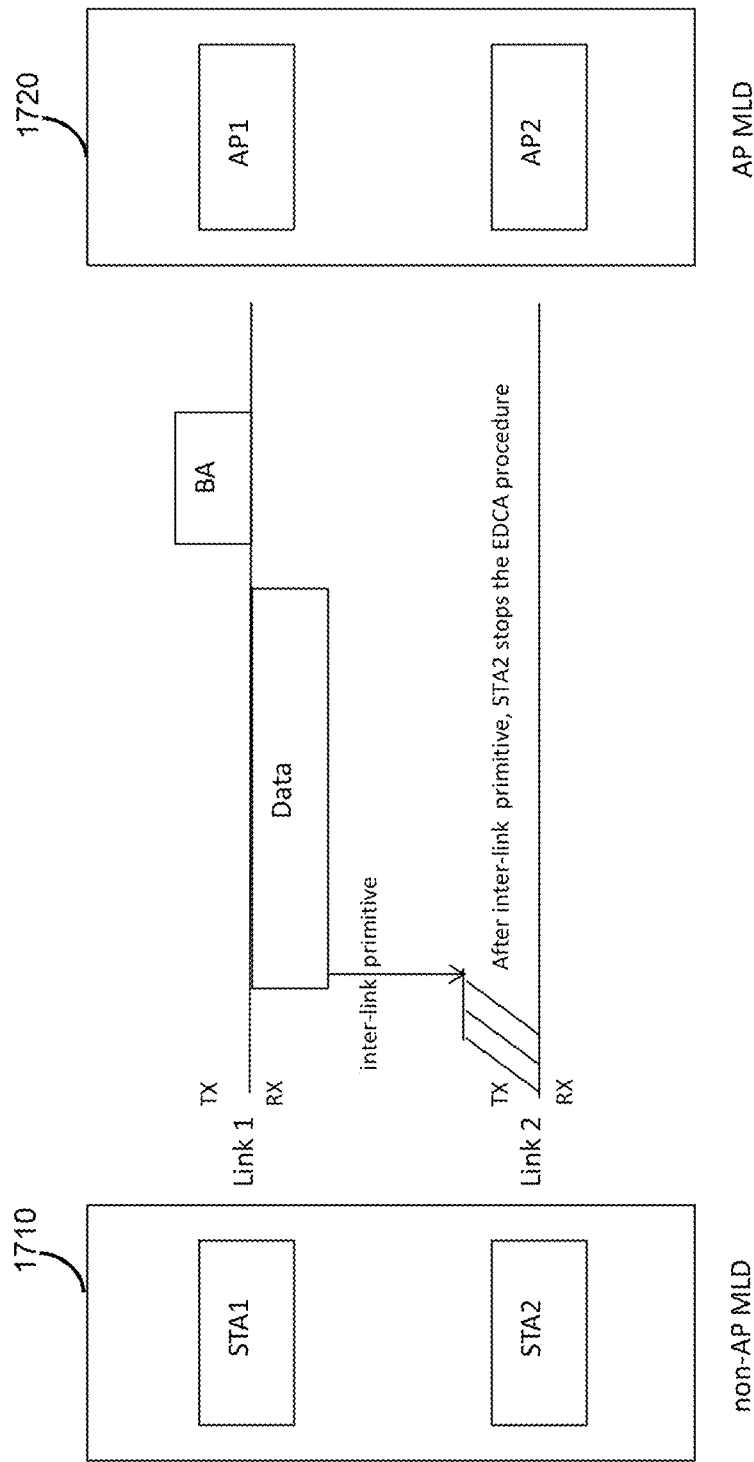
FIG. 17 illustrates an example of multi-link operation for a non-AP MLD, in accordance with some embodiments of the present disclosure.

FIG. 17 illustrates an example of multi-link operation for a non-AP MLD. As shown in FIG. 17, the AP MLD 1720 has two affiliated stations (AP1 and AP2); the non-AP MLD 1710 also has two affiliated stations (STA1 and STA2). The non-AP MLD 1710 is a non-STR non-AP MLD. STA1 of the non-AP MLD 1710 is associated with AP1 of the AP MLD 1720 and communicates with the AP1 on link 1. STA2 of the non-AP MLD 1710 is associated with AP2 of the AP MLD 1720 and communicates with the AP2 on link 2. When STA1 and STA2 are contending the channel access, STA1 is triggered the reception on link1. In this case, the PHY layer of STA1 can send a primitive or physical-clear channel assessment (PHY-CCA) indication to the local MAC of STA1 to indicate that the link1 is busy. When the non-AP MLD 1710 receives this primitive, the non-AP MLD 1710 will send a primitive to the local MAC layer of STA2. When the STA2 receives this primitive, STA2 shall stop to contend the channel access on link2. When the PHY layer of STA1 has received a valid start of a PPDU, including a valid PHY header, the PHY layer of STA1 will send a PHY-RXSTART. indication primitive to the local MAC of STA1.

If STA1 of non-AP MLD 1710 determines to continue to receive this packet, the non-AP MLD 1710 will send a primitive to the STA2. When the non-AP MLD 1710 is a non-STR non-AP MLD, the STA2 cannot contend the channel access until the period which is indicated in the primitive. If the non-AP MLD 1710 is a STR non-AP MLD, the STA2 can contend the channel access using the constrained MCS or transmission power.

Figure 18:
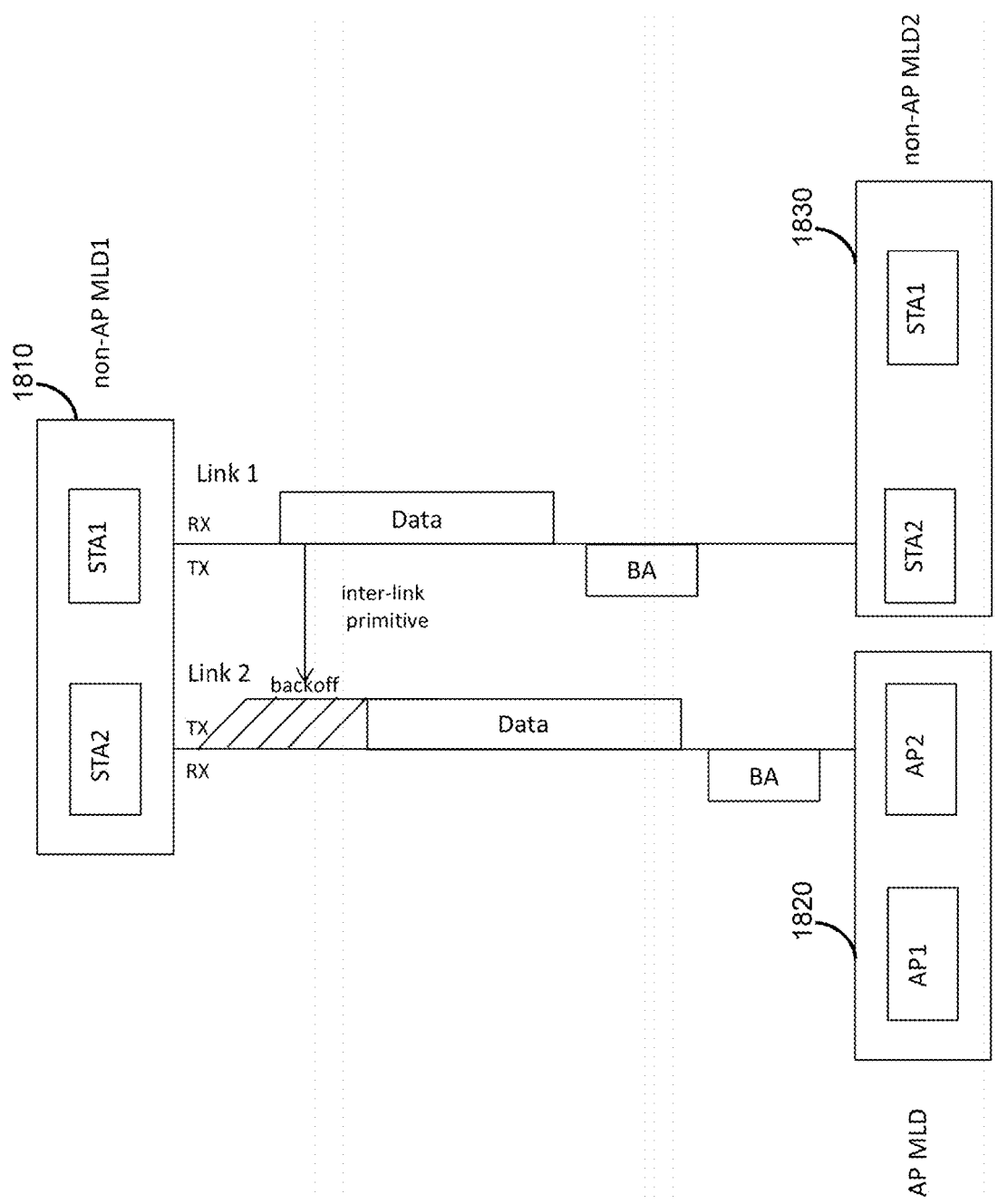
FIG. 18 illustrates another example of multi-link operation for a non-AP MLD, in accordance with some embodiments of the present disclosure.

FIG. 18 illustrates an example of multi-link operation for a non-AP MLD. As shown in FIG. 18, the AP MLD 1820 has two affiliated stations (i.e. AP1 and AP2); each non-AP MLD 1810, 1820 also has two affiliated stations (i.e. STA1 and STA2). Each non-AP MLD is a non-STR non-AP MLD. STA1 of the non-AP MLD1 1810 is associated with AP1 and communicates with AP1 of the AP MLD 1820 on link 1. STA2 of the non-AP MLD1 1810 is associated with AP2 and communicates with AP2 on link 2.

When STA1 and STA2 of the non-AP MLD1 1810 are contending the channel access, STA1 of the non-AP MLD1 1810 is triggered a reception on link1. In this case, the PHY layer of STA1 can send a primitive (i.e. PHY-CCA. indication) to the local MAC of STA1 to indicate that the link1 is busy. When the non-AP MLD1 1810 receives this primitive, the non-AP MLD1 1810 will send a primitive to the local MAC layer of STA2. When the STA2 receives this primitive, STA2 shall stop to contend the channel access on link2.

In one embodiment, STA1 of the non-AP MLD1 1810 determines to stop the reception of this packet on link1, when e.g. the packet from STA2 of the non-AP MLD2 1830 was not intended for the non-AP MLD1 1810, as shown in FIG. 18. In this case, the non-AP MLD1 1810 will send a primitive to the STA2 of the non-AP MLD1 1810. Then the STA2 of the non-AP MLD1 1810 can resume the backoff procedure to contend the channel on link2, e.g. transmitting data after the backoff timer reaches 0.

In various embodiments of the present teaching, an AP MLD can broadcast the STR capability of every link pair, where the STR capability indication is based on a certain bandwidth. The non-AP MLD can report an accurate capability indication between every pair of frequency segments, where the STR capability indication is based on a certain bandwidth. To reduce the overhead, the non-AP MLD may only indicate the STR capability between the farthest pair or the non-AP MLD may only indicate the STR capability between the nearest pair.

In various embodiments of the present teaching, when the non-AP MLD (re) associates with an AP MLD, the non-AP MLD includes the maximum value of self interference and/or the minimum value of self interference for every pair of links in the (re) association request frame. The non-AP MLD may include the following operation parameters of every pair of links in (Re) Association Request frame: STR mode, constrained modulation and coding scheme, constrained transmission power, constrained transmission bandwidth, and/or constrained PPDU Length. If the non-AP MLD is non-STR, an AP MLD can continue to contend the channel on link1 when the AP MLD is receiving on link2. If the non-AP MLD is non-STR, the non-AP MLD controls the operation on link1 based on an indication from link2.

In the present teaching, the technical features in the various embodiments and examples can be used in combination in one embodiment without conflict. Each embodiment is merely an exemplary embodiment of the present application.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

We claim:

1. A method performed by a non-access point (AP) multi-link device (MLD), the method comprising:
   transmitting, in at least one of an association request frame or a re-association request frame, a capability indication for a pair of wireless links, wherein the capability indication uses a bitmap to indicate the pair of links as simultaneous transmission and reception (STR) or non-STR,
   and the association request frame or the re-association request frame comprises a minimum value of self-interference between two links for non-AP MLD; and
   transmitting an information element indicating STR information, wherein the information element comprises:
   an element identification (ID) field indicating an ID of the information element;
   a length field indicating a quantity of octets following the length field in the information element;
   a first link ID field indicating an ID of a first link in the pair of wireless links;
   a second link ID field indicating an ID of a second link in the pair of wireless links;
   an STR bitmap field indicating an STR capability of the first link with respect to the second link; and
   an STR constraint field indicating at least one constraint parameter for an STR operation on the first link with respect to the second link.

2. The method of claim 1, wherein:
   the capability indication indicates whether the non-AP MLD is capable of performing an STR operation on the pair of wireless links;
   the STR operation comprises, for each basic bandwidth of a first link in the pair of wireless links, at least one of:
   transmitting information on the basic bandwidth of the first link when the non-AP MLD is simultaneously receiving information on a second link in the pair of wireless links, or
   receiving information on the basic bandwidth of the first link when the non-AP MLD is simultaneously transmitting information on the second link.

3. The method of claim 1, wherein:
   the capability indication comprises a plurality of bits each of which indicates whether the non-AP MLD is capable of performing an STR operation on a corresponding basic bandwidth of a first link with respect to a second link in the pair of wireless links.

4. The method of claim 1, wherein:
   the capability indication indicates either an STR bandwidth or a non-STR bandwidth;
   the STR bandwidth indicates, among a plurality of basic bandwidths of a first link in the pair of wireless links, a bandwidth range on which the non-AP MLD is capable of performing an STR operation with respect to a second link in the pair of wireless links; or
   the non-STR bandwidth indicates, among the plurality of basic bandwidths of the first link, a bandwidth range on which the non-AP MLD is not capable of performing the STR operation with respect to the second link.

5. The method of claim 1, wherein the capability indication comprises one single bit indicating:
the non-AP MLD is capable of performing an STR operation on every basic bandwidth of the pair of wireless links, or
the non-AP MLD is not capable of performing an STR operation on any basic bandwidth of the pair of wireless links.

6. The method of claim 1, wherein:
the non-AP MLD and a wireless communication node are connected by at least three wireless links having different frequency ranges; and
the method comprises transmitting, to the wireless communication node, a capability information related to STR capability of the non-AP MLD on each basic bandwidth of each pair of frequency-adjacent wireless links among the at least three wireless links.

7. The method of claim 1, further comprising:
transmitting, to a wireless communication node, at least one operation parameter of the pair of wireless links, wherein the at least one operation parameter comprises information related to at least one of:
an STR mode indicating whether simultaneously transmitting and receiving on the pair of links are allowed,
a constrained modulation and coding scheme (MCS) indicating a maximum MCS order used by the wireless communication node to transmit information on a first link in the pair of wireless links when the wireless communication node is receiving information on a second link in the pair of wireless links,
a constrained transmission power indicating a maximum transmission power used by the wireless communication node to transmit information on the first link when the wireless communication node is receiving information on the second link,
a constrained transmission bandwidth indicating a maximum transmission bandwidth used by the wireless communication node to transmit information on the first link when the wireless communication node is receiving information on the second link, or
a constrained data unit length indicating a maximum data unit length used by the wireless communication node to transmit information on the first link when the wireless communication node is receiving information on the second link.

8. The method of claim 1, wherein the information element further comprises:
an STR control field indicating, for each constraint parameter, whether the constraint parameter is present in the STR constraint field of the information element.

9. The method of claim 1, further comprising:
receiving, from a wireless communication node, a second capability information related to STR capability of the wireless communication node on each basic bandwidth of the pair of wireless links between the non-AP MLD and the wireless communication node.

10. The method of claim 9, wherein the STR capability of the wireless communication node indicates, for each basic bandwidth of a first link in the pair of wireless links, at least one of:
whether the wireless communication node is capable of transmitting information on the basic bandwidth of the first link when the wireless communication node is simultaneously receiving information on a second link in the pair of wireless links; or
whether the wireless communication node is capable of receiving information on the basic bandwidth of the first link when the wireless communication node is simultaneously transmitting information on the second link.

11. The method of claim 1, further comprising:
receiving data on a first link in the pair of wireless links;
generating a first indication indicating that the first link is busy during the receiving;
stopping, based on the first indication, a contention for a channel access on a non-STR bandwidth of a second link in the pair of wireless links.

12. The method of claim 1, wherein:
the capability indication comprises a threshold;
for each of a plurality of basic bandwidths of a first link in the pair of wireless links, the capability indication indicates whether an STR operation can be performed on the basic bandwidth with respect to a second link in the pair of wireless links, based on a distance between a center frequency of the basic bandwidth and a center frequency of a using bandwidth of the second link;
the STR operation can be performed when the distance is greater than the threshold;
the STR operation cannot be performed when the distance is less than the threshold.

13. A method performed by a wireless communication node, the method comprising:
receiving, in at least one of an association request frame or a re-association request frame, a capability indication for a pair of wireless links, wherein the capability indication uses a bitmap to indicate the pair of links as simultaneous transmission and reception (STR) or non-STR,
and the association request frame or re-association request frame comprises a minimum value of self interference between two links for non-AP MLD; and
receiving an information element indicating STR information, wherein the information element comprises:
an element identification (ID) field indicating an ID of the information element;
a length field indicating a quantity of octets following the length field in the information element;
a first link ID field indicating an ID of a first link in the pair of wireless links;
a second link ID field indicating an ID of a second link in the pair of wireless links;
an STR bitmap field indicating an STR capability of the first link with respect to the second link; and
an STR constraint field indicating at least one constraint parameter for an STR operation on the first link with respect to the second link.

14. A non-access point (AP) multi-link device (MLD) configured to:
transmit, in at least one of an association request frame or a re-association request frame, a capability indication for a pair of wireless links, wherein the capability indication uses a bitmap to indicate the pair of links as simultaneous transmission and reception (STR) or non-STR,
and the association request frame or re-association request frame comprises a minimum value of self-interference between two links for non-AP MLD; and
transmit an information element indicating STR information, wherein the information element comprises:
an element identification (ID) field indicating an ID of the information element;

a length field indicating a quantity of octets following the length field in the information element;

a first link ID field indicating an ID of a first link in the pair of wireless links;

a second link ID field indicating an ID of a second link in the pair of wireless links;

an STR bitmap field indicating an STR capability of the first link with respect to the second link; and an STR constraint field indicating at least one constraint parameter for an STR operation on the first link with respect to the second link.

15. A non-transitory computer-readable medium having stored thereon computer-executable instructions for carrying out the method of claim 1.

16. A non-transitory computer-readable medium having stored thereon computer-executable instructions for carrying out the method of claim 13.

17. The method of claim 1, further comprising:

transmitting a management frame comprising updates of STR or non-STR mode operation parameters.

\* \* \* \* \*